US010448296B2

(12) United States Patent
Radulescu et al.

(10) Patent No.: US 10,448,296 B2
(45) Date of Patent: Oct. 15, 2019

(54) CODING OF HANDOVER MESSAGES BETWEEN NODES OF DIFFERENT RADIO ACCESS TECHNOLOGIES

(71) Applicant: QUALCOMM Incorporated, San Diego, CA (US)

(72) Inventors: Andrei Dragos Radulescu, San Diego, CA (US); Aziz Gholmieh, Del Mar, CA (US); Tamer Kadous, San Diego, CA (US); Chirag Sureshbhai Patel, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 15/787,653

(22) Filed: Oct. 18, 2017

(65) Prior Publication Data

US 2018/0115933 A1 Apr. 26, 2018

Related U.S. Application Data

(60) Provisional application No. 62/412,274, filed on Oct. 24, 2016.

(51) Int. Cl.
*H04W 36/08* (2009.01)
*H04W 36/00* (2009.01)
(Continued)

(52) U.S. Cl.
CPC ....... *H04W 36/08* (2013.01); *H04W 36/0066* (2013.01); *H04W 36/0072* (2013.01); *H04W 16/14* (2013.01); *H04W 36/14* (2013.01)

(58) Field of Classification Search
CPC ..... H04W 16/16; H04W 88/06; H04W 36/14; H04W 36/00; H04W 88/08;
(Continued)

(56) References Cited

U.S. PATENT DOCUMENTS

2005/0266853 A1* 12/2005 Gallagher ............. H04W 16/16
455/439
2010/0113025 A1*  5/2010 Martin .................. H04W 36/34
455/436
(Continued)

FOREIGN PATENT DOCUMENTS

EP       2429239 A2    3/2012
GB       2507821 A     5/2014
(Continued)

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 14)", 3GPP Standard; 3GPP TS 36.331, 3rd Generation Partnership Project (3GPP), Mobile Competence Centre; 650, Route Des Lucioles; F-06921 Sophia-Antipolis Cedex; France, vol. RAN WG2, No. V14.0.0, Oct. 4, 2016 (Oct. 4, 2016), XP051172918, pp. 1-644, [retrieved on Oct. 4, 2016].
(Continued)

*Primary Examiner* — Julio R Perez
(74) *Attorney, Agent, or Firm* — Holland & Hart LLP/Qualcomm

(57) ABSTRACT

Techniques are provided for efficient handover of a user equipment (UE) between base stations that operate using different radio access technologies (RATs). A handover message to a UE may indicate that the UE is to be handed over from a source base station operating according to a first RAT to a target base station operating according to a second RAT. The handover message may be configured to be transmitted using the first RAT and include embedded information, that is transparent to the first RAT, for the handover to the target base station using the second RAT.

30 Claims, 21 Drawing Sheets

(51) Int. Cl.
*H04W 16/14* (2009.01)
*H04W 36/14* (2009.01)

(58) Field of Classification Search
CPC ......... H04W 36/0072; H04W 36/0066; H04W 36/08; H04W 16/14
See application file for complete search history.

(56) References Cited

U.S. PATENT DOCUMENTS

| | | | |
|---|---|---|---|
| 2015/0350981 A1* | 12/2015 | Huang | H04W 12/04 455/437 |
| 2016/0353292 A1* | 12/2016 | Centonza | H04W 24/02 |
| 2017/0041841 A1* | 2/2017 | Pedersen | H04W 56/0045 |
| 2018/0035344 A1* | 2/2018 | Wang | H04W 36/30 |

FOREIGN PATENT DOCUMENTS

| | | | | |
|---|---|---|---|---|
| WO | WO-2015127241 A1 | | 8/2015 | |
| WO | WO 2017082894 A1 | * | 5/2017 | ............. H04W 4/02 |

OTHER PUBLICATIONS

HTC, "Clarification on mobility to E-UTRA," 3GPP Draft; R2-103929 Clarification on Mobility to E-UTRA (CR. REL-09), 3rd Generation Partnership Project (3GPP), Mobile Competence Centre ; 650, Route Des Lucioles ; F-06921 Sophia-Antipolis Cedex; France, vol. RAN WG2, no. Stockholm, Sweden; 20100628. Jun. 21, 2010 (Jun. 21, 2010), XP050451067, pp. 1-8, [retrieved on Jun. 21, 2010].

ISA/EP, International Search Report and Written Opinion of the International Searching Authority, Int'l Application No. PCT/US2017/057311, dated Jan. 3, 2018, European Patent Office, Rijswijk, NL, 15 pgs.

Samsung et al., "Clarifications Regarding Handover to E-UTRAN," 3GPP Draft; 36331_CROXXX-(REL-9)_R2-104175, 3rd Generation Partnership Project (3GPP), Mobile Competence Centre; 650, Route Des Lucioles; F-06921 Sophia-Anti Polis Cedex; France, vol. RAN WG2, No. Stockholm, Sweden; Jul. 1, 2010, XP050451393, [retrieved on Jul. 1, 2010], 3 pages.

* cited by examiner

CODING OF HANDOVER MESSAGES BETWEEN NODES OF DIFFERENT RADIO ACCESS TECHNOLOGIES

CROSS REFERENCES

The present Application for Patent claims priority to U.S. Provisional Patent Application No. 62/412,274 by Radulescu et al., entitled "Coding of Handover Messages Between Nodes of Different Radio Access Technologies," filed Oct. 24, 2016, assigned to the assignee hereof, and is hereby expressly incorporated by reference herein in its entirety.

TECHNICAL FIELD

The present disclosure relates to wireless communication systems, and more particularly to coding of handover messages between nodes of different radio access technologies (RATs).

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations, each simultaneously supporting communication for multiple communication devices, which may be otherwise known as user equipment (UE).

These multiple access technologies include various different RATs that have been adopted in various telecommunication standards to provide a common protocol that enables different wireless devices to communicate on a municipal, national, regional, and even global level. An example of an emerging RAT telecommunication standard is the MulteFire (MF) RAT, in which stand-alone connections between base stations and UEs may be established using shared radio frequency spectrum (e.g., unlicensed radio frequency spectrum). Whenever a new RAT gets deployed, overlap with one or more existing RATs may necessitate coordination among the different RATs, including handover of a UE from one RAT to another RAT.

SUMMARY

The systems, methods and devices of this disclosure each have several innovative aspects, no single one of which is solely responsible for the desirable attributes disclosed herein.

Various innovative aspects of the subject matter described in this disclosure can be implemented in techniques for handover of a user equipment (UE) between base stations that operate using different radio access technologies (RATs), such as a long term evolution (LTE) RAT and a MulteFire (MF) RAT. In some examples, a handover message to a UE may indicate that the UE is to be handed over from a source base station operating according to an LTE RAT to a target base station operating according to a MF RAT. The target base station, in some examples, may provide a handover message that includes an indication that the UE is to use a default configuration to establish a connection with the target base station, and an indication that the connection with the target base station is to use the MF RAT. In some examples, the indication that the connection with the target base station is to use the MF RAT may be an indication that the target base station operates in a frequency band associated with the MF RAT.

In some examples, the source or target base station may configure a handover message to include an unambiguous indication that the UE is to establish a connection with the target base station using the MF RAT, and also may include embedded information that is encoded according to an encoding scheme of the MF RAT, and that is transparent to the source base station. In additional examples, the handover message may include embedded information that generates a decoding error from a parsing scheme of the LTE RAT, that is transparent to the source base station, and that is parsable by a parsing scheme of the MF RAT. In such examples, the UE, upon detecting a parsing error when using the LTE parsing scheme, may fall back to the MF parsing scheme, decode the handover message, and initiate a connection with the target base station using the MF RAT.

A method for establishing a wireless connection with a UE in a communication system including a source base station operating according to a first RAT is described. The method may include receiving, at the source base station, a handover message that comprises an indication of a default configuration for establishing a connection with a target base station and an indication that the connection with the target base station is via a second RAT different from the first RAT and transmitting, by the source base station, a handover command to the UE based at least in part on the handover message.

An apparatus for establishing a wireless connection with a UE in a communication system including a source base station operating according to a first RAT is described. The apparatus may include means for receiving, at the source base station, a handover message that comprises an indication of a default configuration for establishing a connection with a target base station and an indication that the connection with the target base station is via a second RAT different from the first RAT and means for transmitting, by the source base station, a handover command to the UE based at least in part on the handover message.

Another apparatus for establishing a wireless connection with a UE in a communication system including a source base station operating according to a first RAT is described. The apparatus may include a processor, memory in electronic communication with the processor, and instructions stored in the memory. The instructions may be operable to cause the processor to receive, at the source base station, a handover message that comprises an indication of a default configuration for establishing a connection with a target base station and an indication that the connection with the target base station is via a second RAT different from the first RAT and transmit, by the source base station, a handover command to the UE based at least in part on the handover message.

A non-transitory computer-readable medium for establishing a wireless connection with a UE in a communication system including a source base station operating according to a first RAT is described. The non-transitory computer-readable medium may include instructions operable to cause a processor to receive, at the source base station, a handover message that comprises an indication of a default configuration for establishing a connection with a target base station and an indication that the connection with the target base station is via a second RAT different from the first RAT and transmit, by the source base station, a handover command to the UE based at least in part on the handover message.

Some examples of the method, apparatus, and non-transitory computer-readable medium described above may further include processes, features, means, or instructions for transmitting, by the source base station, a handover request message to the target base station, the handover request message indicating that the UE may be a candidate for handover, wherein the handover message may be received in response to the handover request message.

Some examples of the method, apparatus, and non-transitory computer-readable medium described above may further include processes, features, means, or instructions for receiving, at the source base station, a handover response message from the target base station, wherein the handover response message comprises an RRC configuration message of the first RAT.

In some examples of the method, apparatus, and non-transitory computer-readable medium described above, the handover response message comprises the handover message.

Some examples of the method, apparatus, and non-transitory computer-readable medium described above may further include processes, features, means, or instructions for configuring, by the source base station, the handover command based at least in part on the handover message, wherein the handover command complies with a protocol of the first RAT and the first RAT comprises a 3GPP RAT.

In some examples of the method, apparatus, and non-transitory computer-readable medium described above, the handover command comprises a flag indicator corresponding to the second RAT and the second RAT comprises a MulteFire RAT that operates using an unlicensed radio frequency spectrum band.

In some examples of the method, apparatus, and non-transitory computer-readable medium described above, transmitting the handover command to the UE comprises: transmitting the handover command that comprises the handover message via a dedicated control channel of the first RAT.

In some examples of the method, apparatus, and non-transitory computer-readable medium described above, the dedicated control channel comprises an RRC channel and the first RAT comprises LTE.

In some examples of the method, apparatus, and non-transitory computer-readable medium described above, receiving the handover message comprises: receiving an indication that a frequency of the target base station operates using a frequency band associated with the second RAT.

In some examples of the method, apparatus, and non-transitory computer-readable medium described above, the second RAT comprises a MulteFire RAT.

In some examples of the method, apparatus, and non-transitory computer-readable medium described above, the handover message indicates a set of configuration parameters for the connection with the target base station, wherein the set of configuration parameters comprises one or more default values associated with the second RAT, one or more DMTC parameters associated with the second RAT, or a combination thereof.

In some examples of the method, apparatus, and non-transitory computer-readable medium described above, the default configuration comprises a default channel configuration and a default radio bearer configuration of the target base station.

A method for establishing a wireless connection with a target base station in a communication system including a source base station operating according to a first RAT is described. The method may include receiving, at a UE, a handover command from a source base station, the handover command comprising an indication of a default configuration for establishing a connection with the target base station and an indication that the connection with the target base station is via a second RAT different from the first RAT, applying, at the UE, a configuration associated with the second RAT based at least in part on the indication of the default configuration and the indication that the connection with the target base station is via the second RAT, and initiating, by the UE, handover to the target base station via the second RAT based at least in part on the configuration associated with the second RAT.

An apparatus for establishing a wireless connection with a target base station in a communication system including a source base station operating according to a first RAT is described. The apparatus may include means for receiving, at a UE, a handover command from a source base station, the handover command comprising an indication of a default configuration for establishing a connection with the target base station and an indication that the connection with the target base station is via a second RAT different from the first RAT, means for applying, at the UE, a configuration associated with the second RAT based at least in part on the indication of the default configuration and the indication that the connection with the target base station is via the second RAT, and means for initiating, by the UE, handover to the target base station via the second RAT based at least in part on the configuration associated with the second RAT.

Another apparatus for establishing a wireless connection with a target base station in a communication system including a source base station operating according to a first RAT is described. The apparatus may include a processor, memory in electronic communication with the processor, and instructions stored in the memory. The instructions may be operable to cause the processor to receive, at a UE, a handover command from a source base station, the handover command comprising an indication of a default configuration for establishing a connection with the target base station and an indication that the connection with the target base station is via a second RAT different from the first RAT, apply, at the UE, a configuration associated with the second RAT based at least in part on the indication of the default configuration and the indication that the connection with the target base station is via the second RAT, and initiate, by the UE, handover to the target base station via the second RAT based at least in part on the configuration associated with the second RAT.

A non-transitory computer-readable medium for establishing a wireless connection with a target base station in a communication system including a source base station operating according to a first RAT is described. The non-transitory computer-readable medium may include instructions operable to cause a processor to receive, at a UE, a handover command from a source base station, the handover command comprising an indication of a default configuration for establishing a connection with the target base station and an indication that the connection with the target base station is via a second RAT different from the first RAT, apply, at the UE, a configuration associated with the second RAT based at least in part on the indication of the default configuration and the indication that the connection with the target base station is via the second RAT, and initiate, by the UE, handover to the target base station via the second RAT based at least in part on the configuration associated with the second RAT.

In some examples of the method, apparatus, and non-transitory computer-readable medium described above, receiving the handover command comprises: receiving the handover command from the source base station via a dedicated control channel of the first RAT.

In some examples of the method, apparatus, and non-transitory computer-readable medium described above, the dedicated control channel comprises an RRC channel and the first RAT comprises LTE.

In some examples of the method, apparatus, and non-transitory computer-readable medium described above, receiving the handover command comprises: receiving a handover message that complies with a protocol of the first RAT, wherein the first RAT comprises a 3GPP RAT.

In some examples of the method, apparatus, and non-transitory computer-readable medium described above, the handover command comprises a flag indicator corresponding to the second RAT and the second RAT comprises a MulteFire RAT that operates using an unlicensed radio frequency spectrum band.

Some examples of the method, apparatus, and non-transitory computer-readable medium described above may further include processes, features, means, or instructions for determining, by the UE, a set of configuration parameters for the connection with the target base station based at least in part on the handover command, wherein the configuration may be applied based at least in part on the set of configuration parameters.

In some examples of the method, apparatus, and non-transitory computer-readable medium described above, the set of configuration parameters comprises one or more default values associated with the second RAT, one or more DMTC parameters associated with the second RAT, or a combination thereof.

In some examples of the method, apparatus, and non-transitory computer-readable medium described above, receiving the handover command comprises: receiving an indication that a frequency of the target base station operates using a frequency band associated with the second RAT.

In some examples of the method, apparatus, and non-transitory computer-readable medium described above, the default configuration comprises a default channel configuration and a default radio bearer configuration of the target base station.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

DETAILED DESCRIPTION

Figure 1:
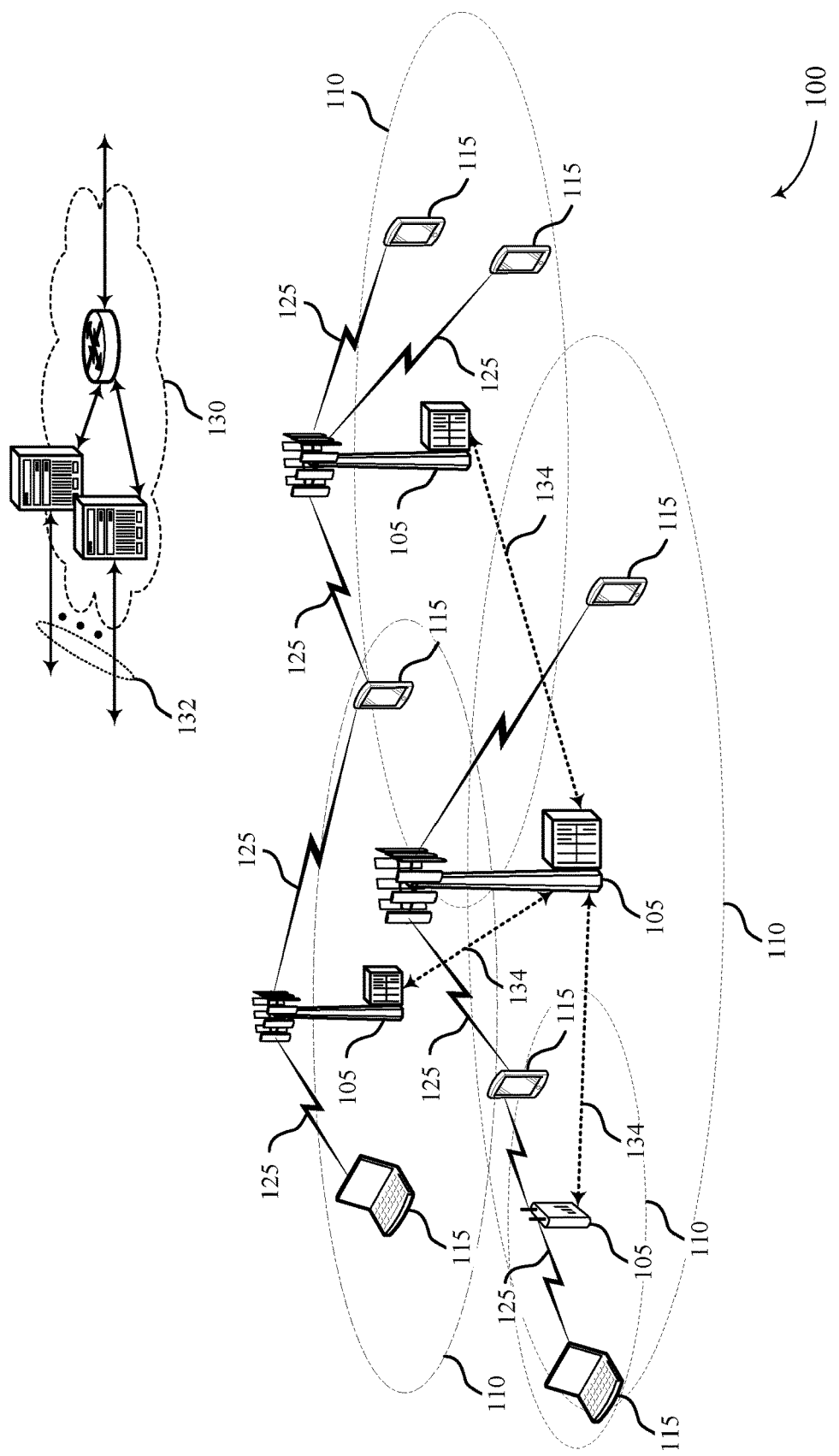
FIG. 1 illustrates an example of a system for wireless communication that supports coding of handover messages between nodes of different radio access technologies (RATs) in accordance with aspects of the present disclosure.

Various techniques are provided for efficient handover of a user equipment (UE) between base stations that operate using different radio access technologies (RATs). In some examples, the different RATs may include a long term evolution (LTE) RAT and a MulteFire (MF) RAT, although techniques provided herein may be implemented in cases involving other RATs. In some examples, a handover message to a UE may indicate that the UE is to be handed over from a source base station operating according to an LTE RAT to a target base station operating according to a MF RAT. In some cases, the source base station may recognize the target base station as a generic LTE base station, and not be aware that the target base station is a MF base station. The source base station may initiate a handover by requesting a handover command from the target base station. In response, the target base station may provide a handover message that may be transmitted by the source base station to the UE to complete the handover.

The target base station, in some examples, may include an indication that the UE is to use a default configuration to establish a connection with the target base station and an indication that the connection with the target base station is to use the MF RAT in the handover message. In some examples, the indication that the connection with the target base station is to use the MF RAT may be an indication that the target base station operates in a frequency band associated with the MF RAT. The indication that the UE is to use a default configuration may be, for example, a fullConfig flag that is set in a RRCConnectionReconfiguration message provided by the target base station.

In some examples, the source or target base station may configure a handover message to include an unambiguous indication that the UE is to establish a connection with the target base station using the MF RAT, and also may include embedded information that is encoded according to an encoding scheme of the MF RAT and that is transparent to the source base station. Such an unambiguous indication may include, for example, a condition that is improperly fulfilled according to proper conditions of the LTE RAT. In some cases, the embedded information may be contained in a handover command, a radio resource control (RRC) connection reconfiguration message, a mobility message, a circuit-switched fall back (CSFB) message, or any other RRC message associated with the second RAT, and which the source base station may pass through to the UE without modification.

In additional examples, the handover message may include embedded information that generates a decoding error from a parsing scheme of the LTE RAT, that is transparent to the source base station, and that is parsable by a parsing scheme of the MF RAT. In such examples, the UE, upon detecting a parsing error when using the LTE parsing scheme, may fall back to the MF parsing scheme, decode the handover message, and initiate a connection with the target base station using the MF RAT.

Aspects of the disclosure are initially described in the context of a wireless communications system. Aspects of the disclosure are additionally illustrated by and described with reference to apparatus diagrams, system diagrams, and flowcharts that relate to coding of handover messages between nodes of different radio access technologies.

FIG. 1 illustrates an example of a wireless communications system 100 that supports coding of handover messages between nodes of different RATs in accordance with aspects of the present disclosure. The wireless communications system 100 includes base stations 105, UEs 115, and a core network 130. In some examples, the wireless communications system 100 may be a LTE (or LTE-Advanced (LTE-A)) network, or MF network. In some cases, wireless communications system 100 may support enhanced broadband communications using shared radio frequency spectrum. Base stations 105 of the wireless communications system 100 may, in some examples, provide a handover message to a UE 115. The handover message may indicate that the UE 115 is to be handed over from a source base station 105 operating according to an LTE RAT to a target base station 105 operating according to a MF RAT.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may additionally be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines (i.e., Machine-to-Machine (M2M) communication). M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs).

A base station 105 may be connected by an S1 interface to the core network 130. The core network may be an evolved packet core (EPC), which may include at least one mobility management entity (MME), at least one serving gateway (S-GW), and at least one packet data network gateway (P-GW). The MME may be the control node that processes the signaling between the UE 115 and the EPC. All user Internet Protocol (IP) packets may be transferred through the S-GW, which itself may be coupled with the P-GW. The P-GW may provide IP address allocation as well as other functions. The P-GW may be coupled with the network operators IP services. The operators IP services may include the Internet, the Intranet, an IP Multimedia Subsystem (IMS), and a Packet-Switched (PS) Streaming Service (PSS). The core network 130 may provide user authentication, access authorization, tracking, IP connectivity, and other access, routing, or mobility functions.

Wireless communications system 100 may support operation on multiple cells or carriers, a feature which may be referred to as carrier aggregation or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD CCs.

In some cases, wireless system 100 may utilize both licensed and unlicensed radio frequency spectrum bands. For example, wireless system 100 may employ LTE License Assisted Access (LTE-LAA), LTE Unlicensed (LTE-U), or MF radio access technology in an unlicensed band such as the 5 GHz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. Operations in unlicensed spectrum may include downlink transmissions, uplink transmissions, or both. Duplexing in unlicensed spectrum may be based on frequency division duplexing (FDD), time division duplexing (TDD) or a combination of both.

Figure 2:
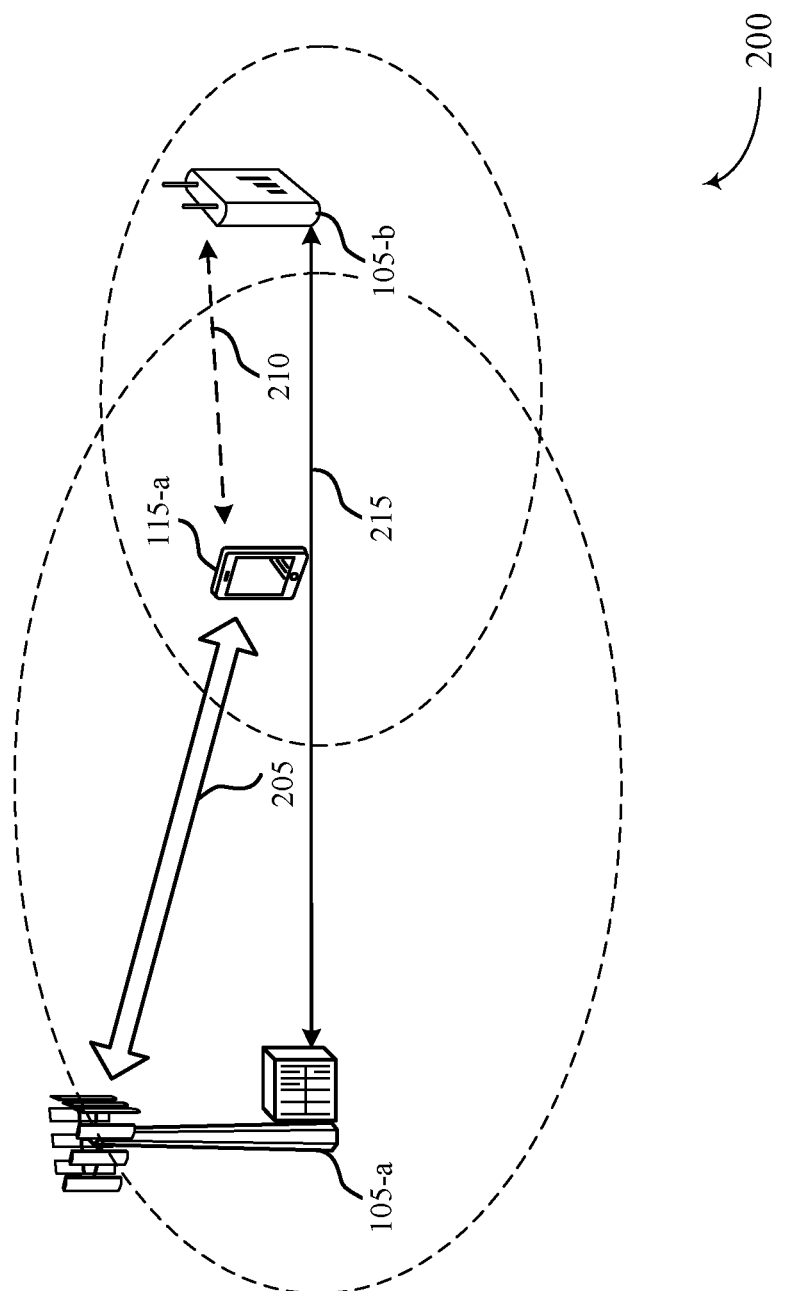
FIG. 2 illustrates an example of a portion of a wireless communication system that supports coding of handover messages between nodes of different RATs in accordance with aspects of the present disclosure.

FIG. 2 illustrates an example of a portion of a wireless communication system 200 that supports coding of handover messages between nodes of different RATs in accordance with aspects of the present disclosure. Wireless communication system 200 may include a source base station 105-a that operates according to an LTE RAN, a target base station 105-b that operates according to a MF RAN, and a UE 115-a that may be handed over from source base station 105-a to target base station 105-b. Source base station 105-a and target base station 105-b may be connected via backhaul link 215 and may exchange handover information, and other information, via the backhaul link 215. In a handover procedure, source base station 105-a may be a source cell and target base station 105-b may be a target cell. The UE 115-a may initially have an established connection 205 with source base station 105-a according to the LTE RAT. Source base station 105-a and target base station 105-b may exchange handover messages via backhaul link 215, and source base station 105-a may transmit a handover command to UE 115-a. Upon receipt of the handover command, UE 115-a may establish connection 210 with target base station 105-b.

In examples where a handover occurs from a source base station 105-a operating according to an LTE RAT to a target base station 105-b operating according to a MF RAT, some issues may be accounted for using techniques disclosed herein. For example, MF technology is developed in a forum distinct from 3GPP, and the coding of MF RRC messages may not be coordinated with 3GPP RRC messages, although a MF base station 105 may appear as a regular LTE base station 105 or an evolved universal terrestrial radio access (EUTRA) LTE node, to an LTE base station 105. Additionally, LTE standards allow the exchange of both LTE and non-LTE RRC messages between supporting nodes (e.g., messages between UE 115-a and handover target base station 105-b), but may not recognize some RATs, such as MF, as a valid handover target. Thus, a mechanism to perform a handover from an LTE source base station 105-a to a MF target base station 105-b may not be established in LTE standards. Handover, in some examples, may be accomplished using a handover message constructed by MF target base station 105-b, and transparently sent over the air by LTE source base station 105-a, to a MF-capable UE 115, such as UE 115-a that is attached to source base station 105-a.

For example, source base station 105-a may expect to send to the handover candidate, UE 115-a, a raw RRC message (e.g., a 3GPP EUTRA type DL-DCCH-Message) constructed by target base station 105-b. Accordingly, UE 115-a may expect established messages of 3GPP type DL-DCCH-Message (e.g., RRRConnectionReconfiguration, MobilityFromEutraCommand, or HandoverFromEutra, etc.) through an established connection with source base station 105-a. In some cases, UE 115-a would be unable to decode messages encoded according to other rules (e.g., a MF type DL-DCCH-Message or DL-DCCH-Message-MF). Techniques provided herein allow target base station 105-b to indicate to UE 115-a that a MF connection is to be established with target base station 105-b. Various examples of such techniques are described in more detail with respect to FIGS. 3 through 5.

Figure 3:
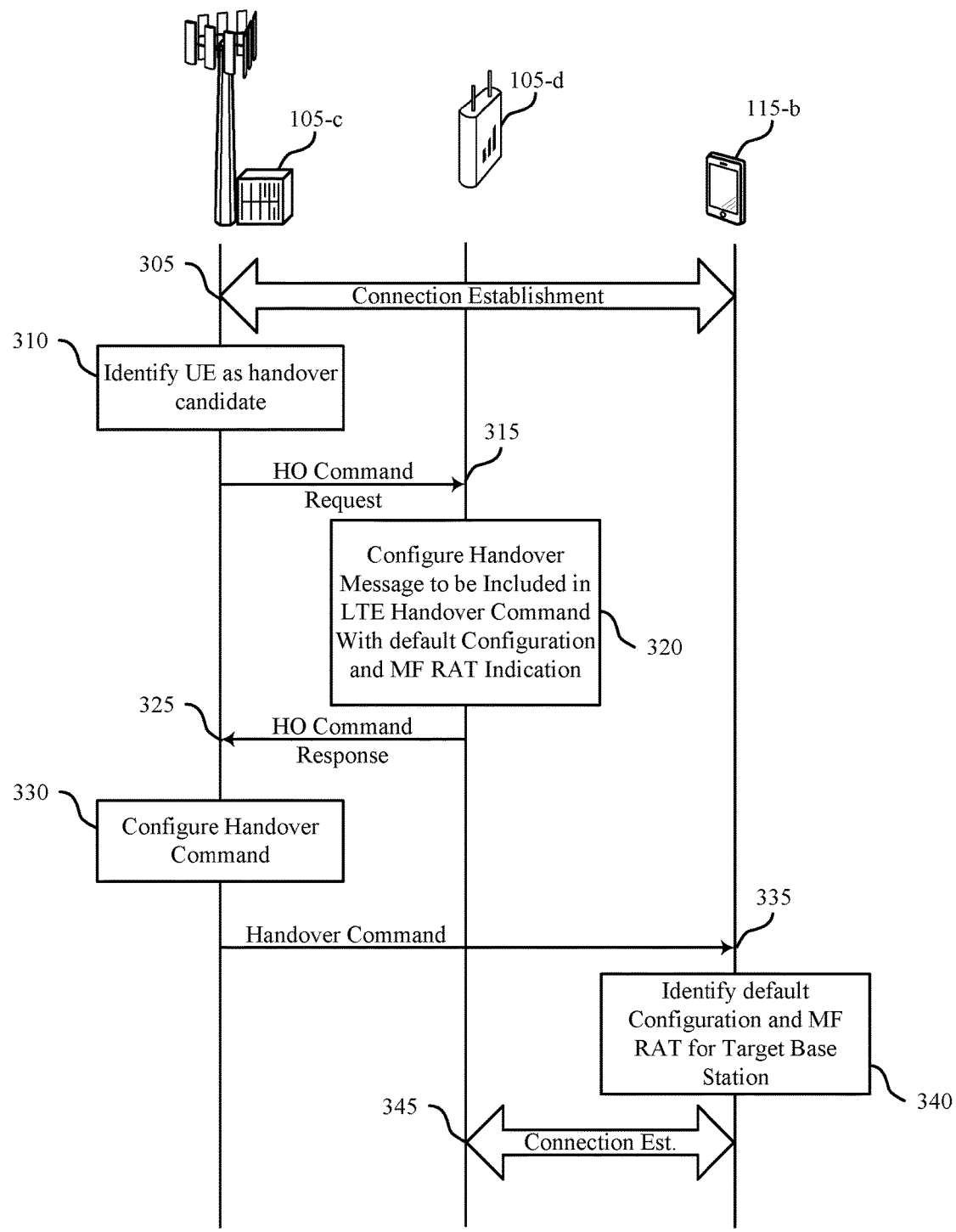
FIG. 3 illustrates an example of a process flow that supports coding of handover messages between nodes of different RATs in accordance with aspects of the present disclosure.

FIG. 3 illustrates an example of a process flow 300 that supports coding of handover messages between nodes of different radio access technologies in accordance with aspects of the present disclosure. Process flow 300 may include a source base station 105-c, a target base station 105-d, and a UE 115-b, which may be examples of the corresponding devices described with reference to FIGS. 1 through 2. Source base station 105-c may operate according to an LTE RAT, and target base station 105-d may operate according to a MF RAT. Source base station 105-c and UE 115-b may establish a connection 305 according to LTE connection establishment techniques. Source base station 105-c, at block 310, may identify UE 115-b as a handover candidate. Such an identification may be made according to established handover techniques for LTE. For example, an identification may be made based on one or more measurement reports of UE 115-b. Source base station 105-c may transmit a handover command request 315 to target base station 105-d. Target base station 105-d may, at block 320, configure a handover message to be included in a LTE handover command, with a default configuration and MF RAT indication. The default configuration may include preconfigured or hardcoded parameters for establishing a connection with target base station 105-d, or parameters not explicitly communicated over the air in the handover message itself.

In this example, existing LTE RRC commands are used to indicate that target base station 105-d is a MF base station. LTE RRC allows for a "fullConfig" handover, where target base station 105-d indicates for UE 115-b to fall back to a default channel configuration and default radio bearer configuration after tuning to the target cell. In this example, target base station 105-d may generate a RRCConnectionReconfiguration message that includes a fullConfig flag. UE 115-b, may recognize that the message (i.e., the RRCConnectionReconfiguration message) in conjunction with another indicator, serve as an indication of a LTE to MF handover by enhancing the default configuration to also account for bare-minimum, pre-determined, or default MF parameters, as will be discussed in more detail below.

Target base station 105-*d* may configure the handover message and provide the handover message in handover command response 325 to source base station 105-*c*. Source base station 105-*c* may, at block 330, configure a handover command that includes the handover message provided by target base station 105-*d*. Source base station 105-*c* may then transmit handover command 335 to UE 115-*b*. Handover command 335 may comply with established LTE handover command protocols and include indications for MF.

UE 115-*b*, at block 340, may identify a default configuration and MF RAT of target base station 105-*d*, and may establish connection 345 with target base station 105-*d* in response thereto. In some examples, UE 115-*b* may receive the handover command 335, which may be a 3GPP-encoded RRCConnectionReconfiguration message that includes the fullConfig flag, and target base station 105-*d* may be recognized to be a MF cell (e.g., recognized through a carrierFreq in MobilityControlInfo of RRCConnectionReconfiguration that is in the MF frequency band). The UE 115-*b* may apply a MF-specific default configuration in response to identifying the default configuration and the MF band indication. Such a technique may provide for a reinterpretation that involves interpreting EUTRA RRC information elements (IEs) in a way consistent with a MF target cell. For example, a default configuration may be pre-specified in UE 115-*b* and known at target base station 105-*d* (e.g., based on MF specification 36.331).

In one particular example, MF-specific information may include a MF discovery management timing configuration (DMTC) for target base station 105-*d*. In some examples, default values may include one or more of the following: 40 or 80 ms periodicity, a window size of 10 ms, or an offset of 0 ms. In some examples, a reinterpreted configuration of the full configuration may include reinterpreting a 3GPP DMTC configuration (including at least one of periodicity, duration, or channel state information (CSI)) associated with a measurement object (such as an object for the frequency of the target cell, or a prior-agreed frequency). The 3GPP DMTC configuration may be found, in some examples, in the 3GPP RRCConnectionReconfiguration message.

Figure 4:
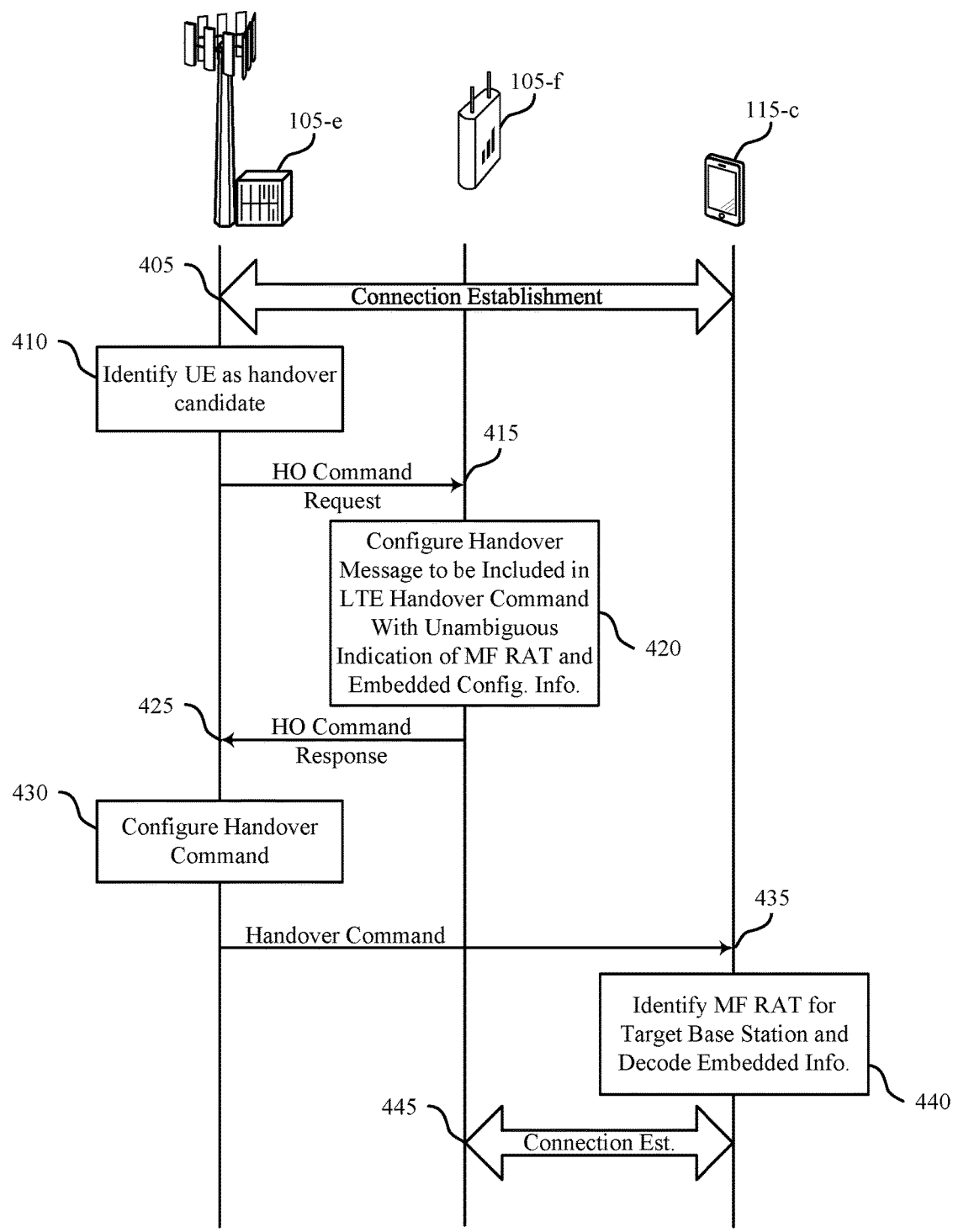
FIG. 4 illustrates an example of another process flow that supports coding of handover messages between nodes of different RATs in accordance with aspects of the present disclosure.

FIG. 4 illustrates an example of a process flow 400 that supports coding of handover messages between nodes of different radio access technologies in accordance with aspects of the present disclosure. Process flow 400 may include source base station 105-*e*, target base station 105-*f*, and UE 115-*c*, which may be examples of the corresponding devices described with reference to FIGS. 1 through 2. Source base station 105-*e* may operate according to an LTE RAT, and target base station 105-*f* may operate according to a MF RAT. Source base station 105-*e* and UE 115-*c* may establish a connection 405 according to LTE connection establishment techniques. Source base station 105-*e*, at block 410, may identify UE 115-*c* as a handover candidate. Such an identification may be made according to established handover techniques for LTE. For example, an identification may be based on one or more measurement reports of UE 115-*c*. Source base station 105-*e* may transmit a handover command request 415 to target base station 105-*f*. Target base station 105-*f*, at block 420, may configure a handover message to be included in a LTE handover command, including an unambiguous indication of a MF RAT and embedded configuration information. The unambiguous indication and the embedded configuration information are discussed in more detail below for several examples.

Target base station 105-*f* may configure the handover message and provide the handover message in handover command response 425 to source base station 105-*e*. Source base station 105-*e* may, at block 430, configure a handover command, that includes the handover message provided by target base station 105-*f*. Source base station 105-*e* may then transmit handover command 435 to UE 115-*c*. Handover command 435 may comply with established LTE handover command protocols and include indications for MF.

UE 115-*c*, at block 440, may identify the MF RAT for target base station 105-*f* and decode the embedded information according to MF decoding techniques. UE 115-*c*, may establish connection 445 with target base station 105-*f* in response thereto. In some examples, established 3GPP LTE RRC messages may be used to embed MF parameters in a handover message. 3GPP LTE RRC messages include multiple messages that allow transparent embedding of information, for example, via an abstract syntax notation one (ASN.1) OCTET STRING. A MF target base station 105-*f* can use any of these messages, and configure its IEs (or parameters) in a way that a MF-capable UE 115-*c* may unambiguously identify that the embedded information is a MF RRC message for a handover towards a target eNB's MF cell. In various examples, the embedded MF messages may be encoded in such a manner so as to avoid encoding messaging in a way that fundamentally breaks 3GPP ASN.1 parsing rules. A MF target base station 105-*f*, in various examples, may not be concerned about a non-MF UE 115 receiving the handover message, as the handover preparation message would make it clear (such as by its very reception, possibly emphasized by inclusion of UE capability information indicating MF support) that the concerned UE 115 is capable of operating using a MF RAT. It is to be noted that although the term "MulteFire message" or "MF message" may be used herein, such a communication may be any ASN.1 (or otherwise encoded) type that is understood by MF-capable UEs 115, including but not limited to: a MF DL-DCCH-Message or DL-DCCH-Message-MF type; a MF RRCConnectionReconfiguration or RRCConnectionReconfiguration-MF type.

In one example, target base station 105-*f* may use a 3GPP RRC MobilityFromEUTRACommand message. In such examples, a MF message may be embedded in one of: mobilityFromEUTRACommand-r(8 or 9)→handover→targetRAT-MessageContainer; an unused (and unlikely to be used) lateNonCriticalExtension (e.g., in MobilityFromEUTRACommand-v8a0 or MobilityFromEUTRACommand-v930-IEs); a new (expanded) choice in the purpose IE (directly, or in a sub-IE thereof); or a messageContCDMA2000-1×RTT IE in E-CSFB. In some cases, the MF message condition, may be indicated by one of: a targetRAT-Type (in the handover IE) set to one of the utra or geran code points, with a nas-SecurityParamFromEUTRA (e.g., if the target was Global Systems for Mobile communications (GSM) Enhanced Data rates for Global Evolution (EDGE) Radio Access Network GERAN or Universal Mobile Telecommunication System (UNITS) Terrestrial Radio Access Network (UTRAN)) being absent; a targetRAT-Type (in the handover IE) that is set to a code point other than geran, but BandIndicatorGERAN is present; a targetRAT-Type (in the handover IE) that is set to the geran code point, but BandIndicatorGERAN is absent; or a new (or expanded) choice in the purpose IE (directly, or in a sub-IE thereof).

In a second example, target base station 105-*f* may use a 3GPP RRC MobilityFromEUTRACommand message. In such cases, a MF message may be embedded in a message- ContCDMA2000-1×RTT IE in E-CSFB, and a MF message condition, can be one of an absence of messageContCDMA2000-HRPD when mobilityCDMA2000-HRPD=redirection; or an absence of messageContCDMA2000-HRPD when mobilityCDMA2000-HRPD=handover.

In a third example, target base station 105-*f* may use a 3GPP RRC MobilityFromEUTRACommand message, in which a MF message may be embedded in one of: a spare of criticalExtensions (or a sub-IE thereof); a criticalExtensionsFuture of MobilityFromEUTRACommand (or a sub-IE thereof); or a criticalExtensionsFuture in a sub-IE of MobilityFromEUTRACommand (or a sub-IE thereof). In such examples, the MF message condition, may be a presence of above spare or expanded choice (or a sub-IE thereof).

In a fourth example, target base station 105-*f* may use a 3GPP RRC RRCConnectionReconfiguration message. In such examples, the MF message may be embedded in a systemInformationBlockType1Dedicated-r11 (which is meant to contain SIB1 in 3GPP), and a MF message condition, can be one of: a MobilityControlInfo that contains a carrierFreq in a MF band; or any other condition mentioned in the next example.

In yet another example, target base station 105-*f* may use a 3GPP RRC HandoverFromEUTRAPreparationRequest or MobilityFromEUTRACommand, or any other 3GPP RRC message. In such examples, the MF message may be embedded in one of: any IE defined as an OCTET STRING, where an OCTET STRING is explicitly mentioned to contain another IE type, and the message condition may be decoded prior to the parsing of the IE of the OCTET STRING type; any spare (or sub-IE thereof); or any criticalExtension (or sub-IE thereof). In some cases, the MF message condition, can be one of: any condition on an IE or combination of IEs that would be considered invalid by a non-MF UE 115 parsing the message; the presence of a specific spare undefined in 3GPP (or sub-IE thereof); the presence of a specific criticalExtension (or sub-IE thereof); or the presence of a specific carrier parameter that belongs to a MF band. Additionally or alternatively, target base station 105-*f* may use a CSFBParametersResponseCDMA2000 message.

In some cases, when using particular ASN.1 IEs, messages, enumeration values, or types, the MF specification may rename them, as long as their types (or encoding) remains the same. For example, if the targetRAT-Type code point for geran is overloaded to mean GERAN or MF, as indicated in a prior example, the name of that code point can be changed to geranOrMf, in the MF specification.

While the above examples, describe target base station 105-*f* configuring the handover message, such procedures may be performed by source base station 105-*e* in cases where source base station 105-*e* may be aware that target base station 105-*f* is a MF base station 105. In such examples, if source base station 105-*e* is MF-aware, base station 105-*e* may accept a MF message from target base station 105-*f*, but use a transparent embedding mechanism, as described with reference to FIG. 4, to ensure that a MF-capable UE 115 properly decodes the message. For example, source base station 105-*e* may determine that target base station 105-*f* has constructed a MF message, via mechanisms not restricted to: configuration at source base station 105-*e* of the MF capabilities of a neighbor base station 105; target registration area/cell id./MME/PLMN-ID; or a measurement report physical report (e.g., from a physical layer and measurements such as frequency, or pilot indicating a MutleFire target cell) that triggered the handover.

Figure 5:
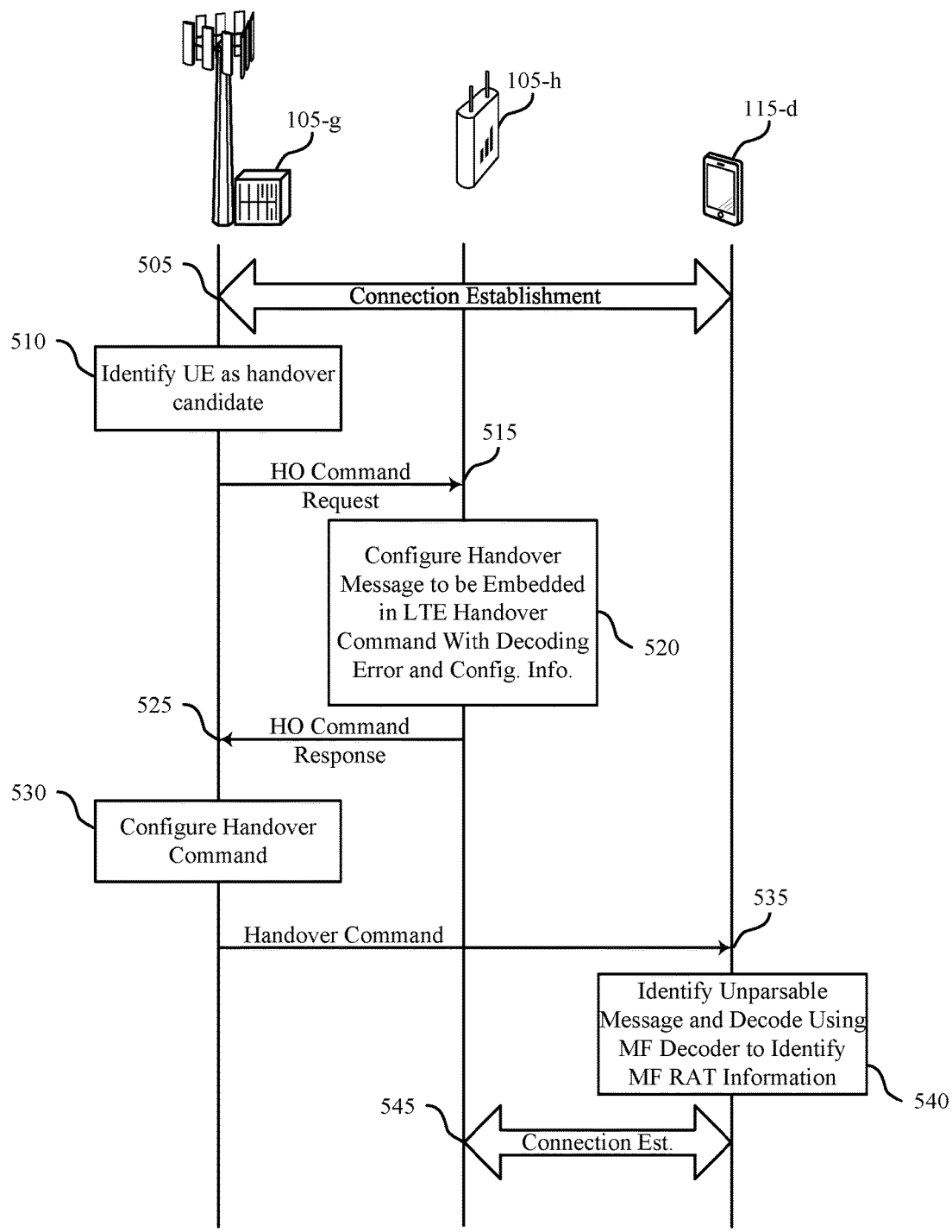
FIG. 5 illustrates an example of another process flow that supports coding of handover messages between nodes of different RATs in accordance with aspects of the present disclosure.

FIG. 5 illustrates an example of a process flow 500 that supports coding of handover messages between nodes of different radio access technologies in accordance with aspects of the present disclosure. Process flow 500 may include source base station 105-*g*, target base station 105-*h*, and UE 115-*d*, which may be examples of the corresponding devices described with reference to FIGS. 1 through 2. Source base station 105-*g* may operate according to an LTE RAT, and target base station 105-*h* may operate according to a MF RAT. Source base station 105-*g* and UE 115-*d* may establish a connection 505 according to LTE connection establishment techniques. Source base station 105-*g*, at block 510, may identify UE 115-*d* as a handover candidate. Such an identification may be made according to established handover techniques for LTE (e.g., based on one or more measurement reports of the UE 115-*d*). Source base station 105-*g* may transmit a handover command request 515 to target base station 105-*h*. Target base station 105-*h*, at block 520, may configure a handover message to be included in a LTE handover command, with an embedded message that will prompt an error by a parser that decodes the message according to 3GPP decoding techniques. Such an embedded message is discussed in more detail below for several examples.

Target base station 105-*h* may configure the handover message and provide the handover message in handover command response 525 to source base station 105-*g*. Source base station 105-*g* may, at block 530, configure a handover command, that includes the handover message provided by target base station 105-*h*. Source base station 105-*g* may then transmit handover command 535 to UE 115-*d*. Handover command 535 may comply with established LTE handover command protocols with indications for MF.

UE 115-*d*, at block 540, may identify the unparsable message and decode the unparsable message using a MF decoder to identify MF RAT information for target base station 105-*h*. Source base station 105-*g*, may establish connection 545 with target base station 105-*h* in response thereto. In this example, a MF-capable UE 115 connected to a 3GPP cell may be specified to fall back to the MF parser, if any (or a specific) ASN.1 error is found in decoding the handover message. With this approach, target base station 105-*h* can construct a MF message that triggers an ASN.1 error when parsed with a 3GPP parser. UE 115-*d* would then correctly interpret the MF message on a second pass. If an ASN.1 error is still generated on the second pass, UE 115-*d* may fall back to the 3GPP mechanism to handle ASN.1 errors. In one example, such a message may be transmitted using a RRCConnectionReconfiguration message. For example, the message may use an undefined third ENUMERATED entry in networkControlledSyncTx-r12, to trigger an ASN.1 error (e.g., "SL-SyncTxControl-r12::=SEQUENCE {networkControlledSyncTx-r12 ENUMERATED {on, off, multeFire} OPTIONAL—Need OP}). A new version of the RRCConnectionReconfiguration message in such cases may be defined in the MF specification, in a way that does not trigger an ASN.1 error, while adding MF content.

In additional examples, the examples of FIG. 3 may be specified alongside any of the examples of FIGS. 4 through 5, for handling MF handovers (or other messages with MF content that are to be sent to MF-capable UEs connected to LTE cells).

Figure 6:
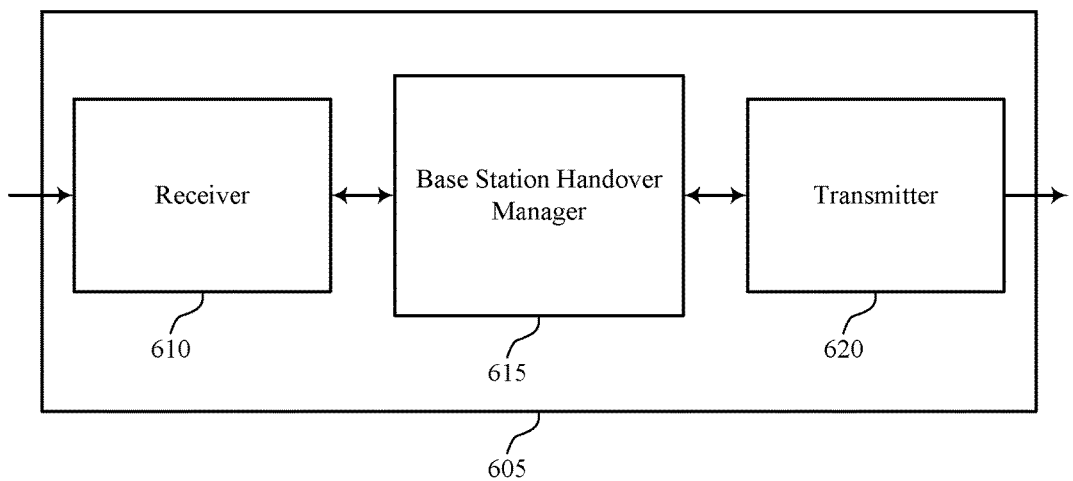
FIGS. 6 through 8 show block diagrams of a device that supports coding of handover messages between nodes of different RATs in accordance with aspects of the present disclosure.

FIG. 6 shows a block diagram 600 of a wireless device 605 that supports coding of handover messages between nodes of different radio access technologies in accordance with aspects of the present disclosure. Wireless device 605 may be an example of aspects of a base station 105 as described with reference to FIG. 1. Wireless device 605 may include receiver 610, base station handover manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to coding of handover messages between nodes of different radio access technologies, etc.). Information may be passed on to other components of the device. The receiver 610 may be an example of aspects of the transceiver 935 described with reference to FIG. 9.

Base station handover manager 615 may be an example of aspects of the base station handover manager 715, 815, and 915 described with reference to FIGS. 7 through 9.

In a first example, base station handover manager 615 may identify that a handover of a UE 115 from a source base station 105 to a target base station 105 is to be performed, where the target base station 105 operates using a first RAT and the source base station 105 operates using a second RAT. Base station handover manager 615 may also identify a handover message to be transmitted to the UE 115, the handover message including an indication that the UE 115 is to use a default configuration to establish a connection with the target base station 105 and an indication that the connection with the target base station 105 is to use the first RAT.

In a second example, the base station handover manager 615 may also identify that a handover of a UE 115 from a source base station 105 to a target base station 105 is to be performed, where the target base station 105 operates using a first RAT and the source base station 105 operates using a second RAT. Base station handover manager 615 may also identify a handover message to be transmitted to the UE 115, the handover message including an unambiguous indication that the UE 115 is to establish a connection with the target base station 105 using the first RAT, and embedded information that is encoded according to an encoding scheme of the first RAT and that is transparent to the source base station 105.

In a third example, the base station handover manager 615 may also identify that a handover of a UE 115 from a source base station 105 to a target base station 105 is to be performed, where the target base station 105 operates using a first RAT and the source base station 105 operates using a second RAT. Base station handover manager 615 may also identify a handover message to be transmitted to the UE 115, the handover message including embedded information that generates a decoding error from a first parsing scheme of the second RAT and that is transparent to the source base station 105.

In a fourth example, the base station handover manager 615 may also establish a wireless connection with a UE in a communication system including a source base station operating according to a first RAT by receiving a handover message for a source base station 105 that comprises an indication of a default configuration for establishing a connection with a target base station 105 and an indication that the connection with the target base station 105 is via a second RAT different from the first RAT. Base station handover manager 615 may also transmit a handover command from the source base station 105 to the UE 115 based at least in part on the handover message.

Transmitter 620 may transmit signals generated by other components of wireless device 605. In some examples, the transmitter 620 may be collocated with a receiver 610 in a transceiver module. For example, the transmitter 620 may be an example of aspects of the transceiver 935 described with reference to FIG. 9. The transmitter 620 may include a single antenna or a set of antennae. For example, transmitter 620 may transmit the handover message to a UE 115.

Figure 7:
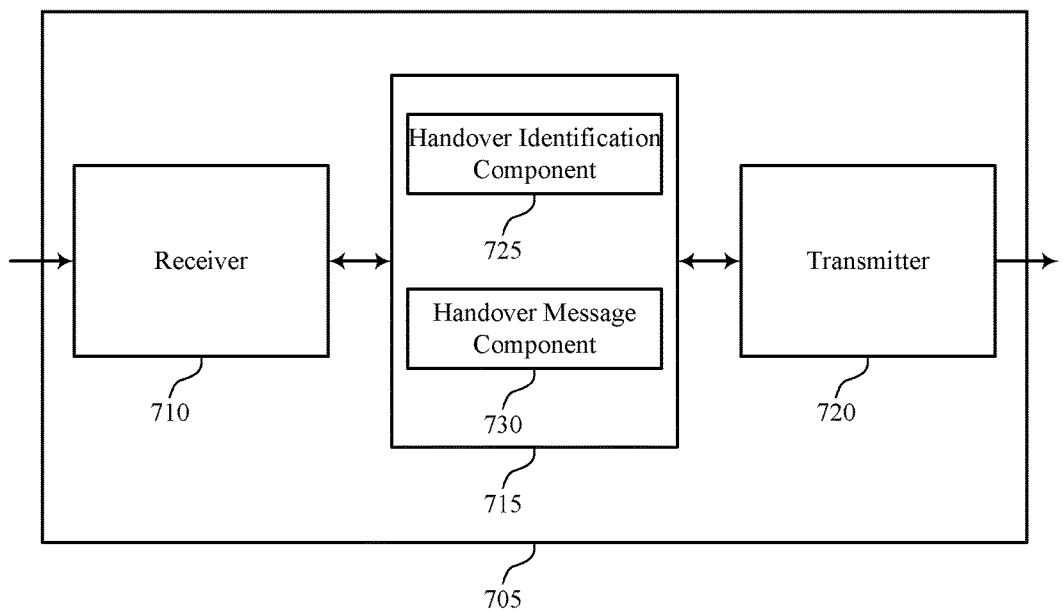

FIG. 7 shows a block diagram 700 of a wireless device 705 that supports coding of handover messages between nodes of different radio access technologies in accordance with aspects of the present disclosure. Wireless device 705 may be an example of aspects of a wireless device 605 or a base station 105 as described with reference to FIGS. 1 and 6. Wireless device 705 may include receiver 710, base station handover manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to coding of handover messages between nodes of different radio access technologies, etc.). Information may be passed on to other components of the device. The receiver 710 may be an example of aspects of the transceiver 935 described with reference to FIG. 9.

Base station handover manager 715 may be an example of aspects of the base station handover manager 915 described with reference to FIG. 9. Base station handover manager 715 may also include handover identification component 725 and handover message component 730.

Handover identification component 725 may identify that a handover of a UE 115 from a source base station 105 to a target base station 105 is to be performed, where the target base station 105 operates using a first RAT and the source base station 105 operates using a second RAT. In some cases, the second RAT includes a RAT that conforms to 3GPP standards and the first RAT includes a MF RAT that is different than the second RAT and that operates using a shared radio frequency spectrum band.

Handover message component 730 may identify a handover message to be transmitted to a UE 115, the handover message including an indication that the UE 115 is to use a default configuration to establish a connection with a target base station 105 and an indication that the connection with the target base station 105 is to use the first RAT. In some cases, the default configuration may include a default channel configuration and a default radio bearer configuration of the target base station 105. In some examples, handover message component 730 may identify a handover message to be transmitted to the UE 115, the handover message including an unambiguous indication that the UE 115 is to establish a connection with the target base station 105 using the first RAT, and embedded information that is encoded according to an encoding scheme of the first RAT and that is transparent to a source base station 105. In additional examples, the handover message component 730 may embed the embedded information in the handover message to be transmitted to the UE 115, and identify a handover message to be transmitted to the UE 115, the handover message including embedded information that generates a decoding error from a first parsing scheme of the second RAT and that is transparent to the source base station 105. In some cases, the embedding is performed by the source base station 105 or by the target base station 105.

The handover message component 730 may also receive a handover message for a source base station 105 that may include an indication of a default configuration for establishing a connection with a target base station 105 and an indication that the connection with the target base station 105 is via a second RAT different from the first RAT. The handover message component 730 may also transmit a handover command from the source base station 105 to the UE 115 based at least in part on the handover message.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may include a single antenna or a set of antennae.

Figure 8:
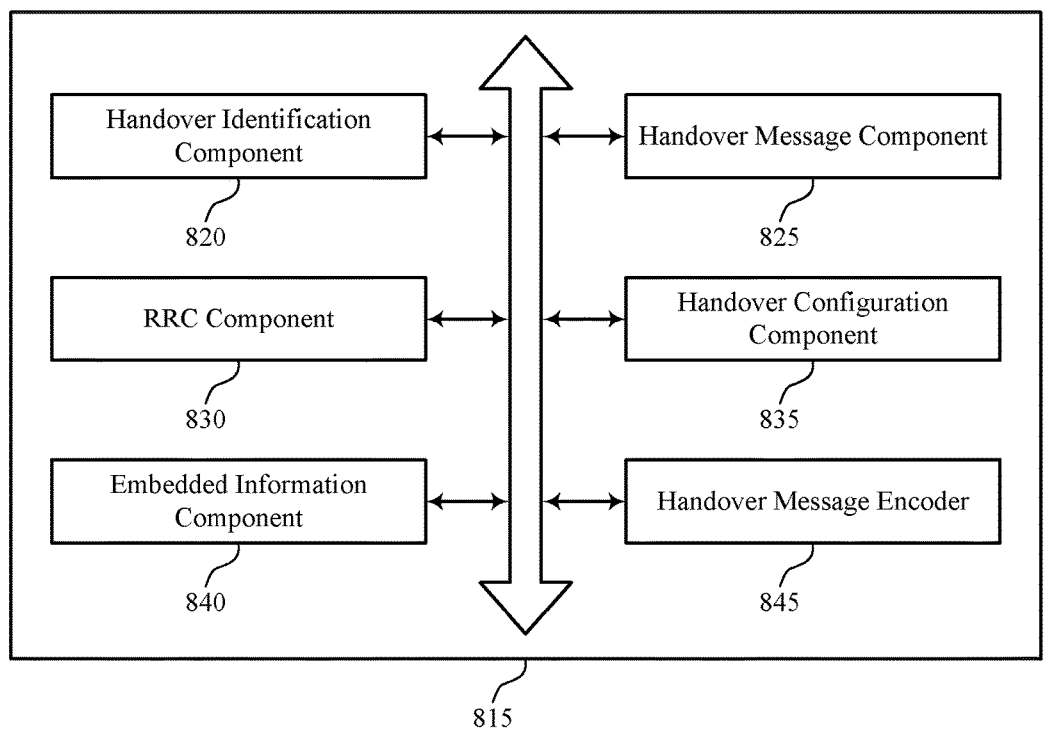

FIG. 8 shows a block diagram 800 of a base station handover manager 815 that supports coding of handover messages between nodes of different radio access technologies in accordance with aspects of the present disclosure. The base station handover manager 815 may be an example of aspects of a base station handover manager 615, a base station handover manager 715, or a base station handover manager 915 described with reference to FIGS. 6, 7, and 9. The base station handover manager 815 may include handover identification component 820, handover message component 825, RRC component 830, handover configuration component 835, embedded information component 840, and handover message encoder 845. Each of these modules may communicate, directly or indirectly, with one another (e.g., via one or more buses).

Handover identification component 820 may identify that a handover of a UE 115 from a source base station 105 to a target base station 105 is to be performed, where the target base station 105 operates using a first RAT and the source base station 105 operates using a second RAT. In some cases, the second RAT includes a RAT that conforms to 3GPP standards and the first RAT includes a MF RAT that is different than the second RAT and that operates using a shared radio frequency spectrum band. Handover identification component 820 may also transmit a handover request message from the source base station 105 to the target base station 105, where the handover request message indicates that the UE is a candidate for handover. The handover message may be received in response to the handover request message.

Handover message component 825 may identify a handover message to be transmitted to a UE 115, the handover message including an indication that the UE 115 is to use a default configuration to establish a connection with a target base station 105 and an indication that the connection with the target base station 105 is to use the first RAT. In some cases, the default configuration may include a default channel configuration and a default radio bearer configuration of the target base station 105. In some examples, handover message component 825 may identify a handover message to be transmitted to the UE 115, the handover message including an unambiguous indication that the UE 115 is to establish a connection with the target base station 105 using the first RAT, and embedded information that is encoded according to an encoding scheme of the first RAT and that is transparent to a source base station 105. In additional examples, the handover message component 825 may embed the embedded information in the handover message to be transmitted to the UE 115, the handover message including embedded information that generates a decoding error from a first parsing scheme of the second RAT and that is transparent to the source base station 105. In some cases, the embedding is performed by the source base station 105 or by the target base station 105.

Handover message component 825 may also receive a handover message for a source base station 105 that includes an indication of a default configuration for establishing a connection with a target base station 105 and an indication that the connection with the target base station 105 is via a second RAT different from the first RAT. The handover message component 825 may also transmit a handover command from the source base station 105 to the UE 115 based at least in part on the handover message.

RRC component 830 may provide an indication that a UE 115 is to use a default configuration, such as a fullConfig flag in an RRCConnectionReconfiguration message as defined by the 3GPP standards. In some cases, the indication that the connection with a target base station 105 is to use the first RAT includes an indication that a frequency of the target base station 105 is in a frequency band associated with the MF RAT. RRC component 830 may also receive for the source base station 105 a handover response message from the target base station 105, wherein the handover response message includes an RRC configuration message of the first RAT. In some examples, the handover response message includes the handover message.

Handover configuration component 835 may provide an indication that one or more configuration parameters are to be used to establish the connection with a target base station 105. In some cases, the one or more configuration parameters are signaled in the handover message or are default values. In some cases, the one or more configuration parameters include one or more DMTC parameters. In some cases, the embedded information is contained in a handover command, an RRC connection reconfiguration message, a mobility message, a CSFB message, or any other RRC message associated with the second RAT.

Handover configuration component 835 may also configure, for the source base station 105, the handover command based at least in part on the handover message, wherein the handover command complies with a protocol of the first RAT and the first RAT comprises a 3GPP RAT. In some cases, the handover command comprises a flag indicator corresponding to the second RAT and the second RAT comprises a MulteFire RAT that operates using an unlicensed radio frequency spectrum band. The handover message indicates a set of configuration parameters for the connection with the target base station, wherein the set of configuration parameters includes one or more default values associated with the second RAT, one or more DMTC parameters associated with the second RAT, or a combination thereof.

Embedded information component 840 may, in some examples, provide an unambiguous indication that indicates to a UE 115 that the embedded information is to be decoded according to a decoding scheme of the first RAT. In some cases, the unambiguous indication includes a condition that is improperly fulfilled according to proper conditions of the second RAT.

Handover message encoder 845 may provide, after a parsing error, an indication to a UE 115 to attempt to decode the embedded information using a second parsing scheme of the first RAT. In some cases, the first parsing scheme includes a 3GPP parsing scheme and the decoding error includes an ASN.1 error.

Figure 9:
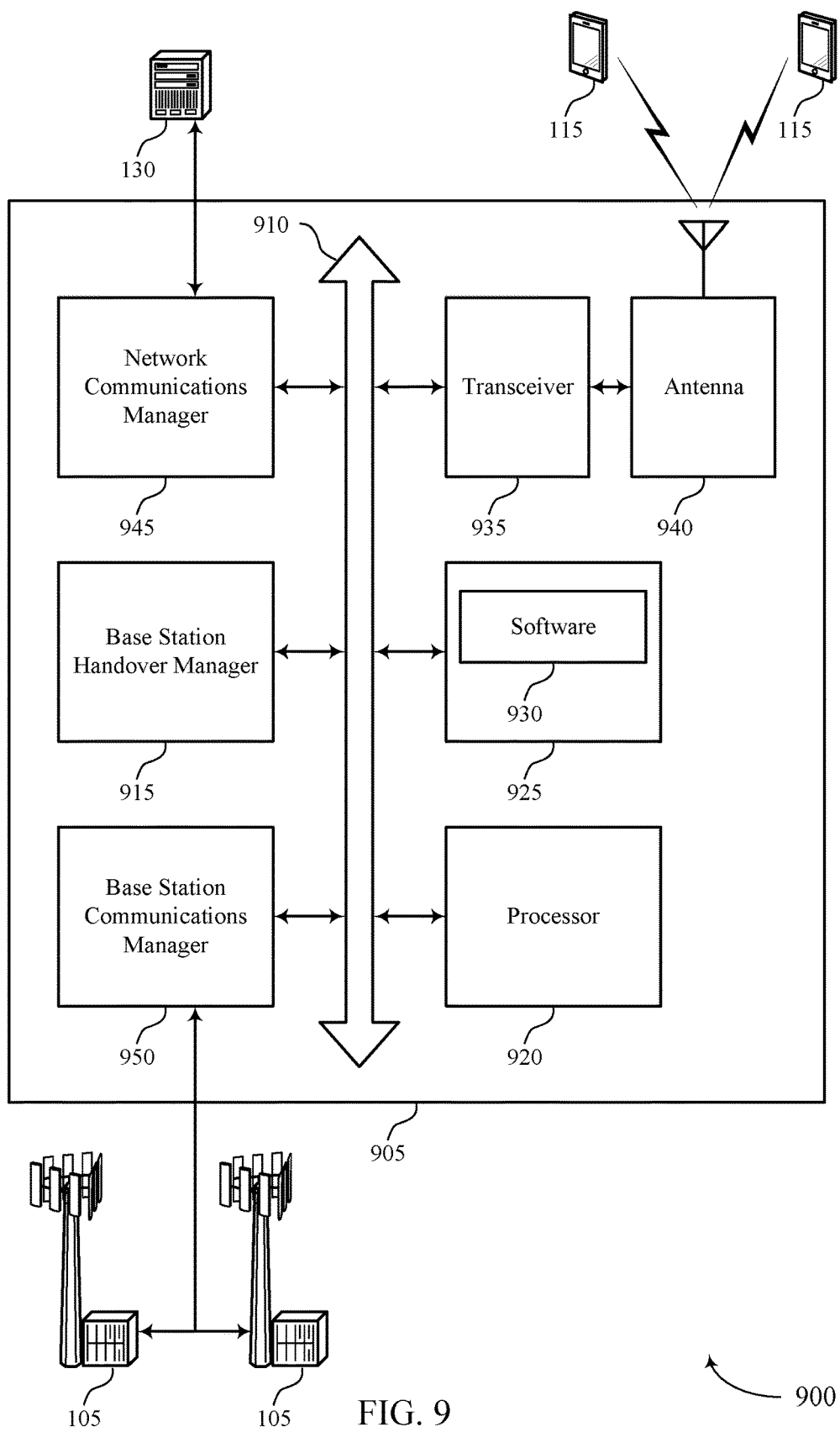
FIG. 9 illustrates a block diagram of a system including a base station that supports coding of handover messages between nodes of different RATs in accordance with aspects of the present disclosure.

FIG. 9 shows a block diagram of a system 900 including a device 905 that supports coding of handover messages between nodes of different radio access technologies in accordance with aspects of the present disclosure. Device 905 may be an example of or include the components of wireless device 605, wireless device 705, or a base station 105 as described with reference to FIGS. 1, 6, and 7. Device 905 may include components for bi-directional voice and data communications including components for transmitting and receiving communications, including base station handover manager 915, processor 920, memory 925, software 930, transceiver 935, antenna 940, network communications manager 945, and base station communications manager 950. These components may be in electronic communication via one or more busses (e.g., bus 910). Device 905 may communicate wirelessly with one or more UEs 115.

Processor 920 may include an intelligent hardware device, (e.g., a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting coding of handover messages between nodes of different RATs).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware and/or software operation such as the interaction with peripheral components or devices.

Software 930 may include code to implement aspects of the present disclosure, including code to support coding of handover messages between nodes of different radio access technologies. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the device 905 may include a single antenna 940. However, in some cases the device 905 may have more than one antenna 940, which may be capable of concurrently transmitting or receiving multiple wireless transmissions.

Network communications manager 945 may manage communications with the core network (e.g., via one or more wired backhaul links). For example, the network communications manager 945 may manage the transfer of data communications for client devices, such as one or more UEs 115.

Base station communications manager 950 may manage communications with other base stations 105, and may include a controller or scheduler for controlling communications with UEs 115 in cooperation with other base stations 105. For example, the base station communications manager 950 may coordinate scheduling for transmissions to UEs 115 for various interference mitigation techniques such as beamforming or joint transmission. In some examples, base station communications manager 950 may provide an X2 interface within an LTE/LTE-A wireless communication network technology to provide communication between base stations 105.

Figure 10:
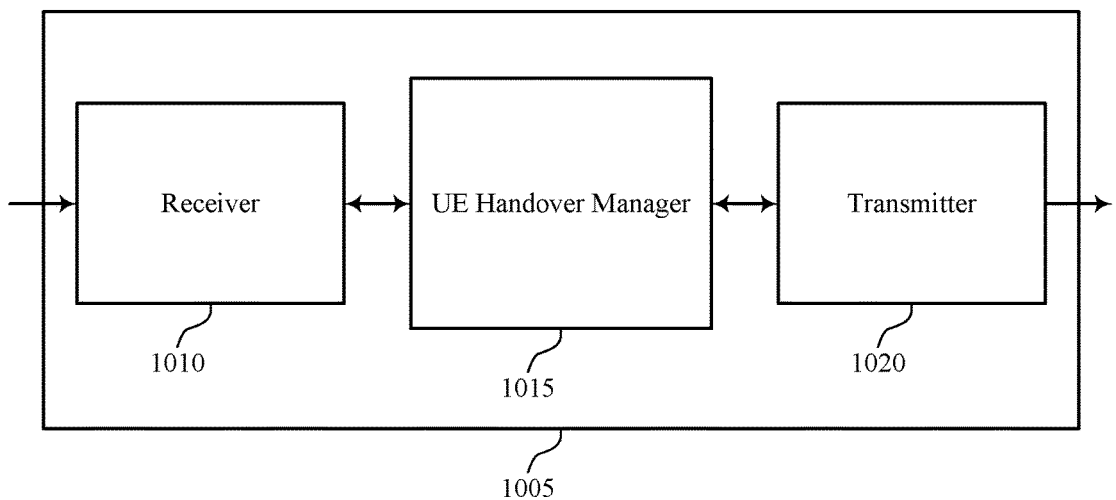
FIGS. 10 through 12 show block diagrams of a device that supports coding of handover messages between nodes of different RATs in accordance with aspects of the present disclosure.

FIG. 10 shows a block diagram 1000 of a wireless device 1005 that supports coding of handover messages between nodes of different radio access technologies in accordance with aspects of the present disclosure. Wireless device 1005 may be an example of aspects of a UE 115 as described with reference to FIG. 1. Wireless device 1005 may include receiver 1010, UE handover manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to coding of handover messages between nodes of different radio access technologies, etc.). Information may be passed on to other components of the device. The receiver 1010 may be an example of aspects of the transceiver 1335 described with reference to FIG. 13.

UE handover manager 1015 may be an example of aspects of the UE handover manager 1315 described with reference to FIG. 13.

UE handover manager 1015 may receive a handover message at UE 115 indicating that a handover from a source base station 105 to a target base station 105 is to be performed, where the target base station 105 operates using a first RAT and the source base station 105 operates using a second RAT. UE handover manager 1015 may identify, in the handover message, an indication that the wireless device 1005 is to use a default configuration to establish a connection with the target base station 105 and an indication that the connection with the target base station 105 is to use the first RAT, and initiate the handover to the target base station 105 responsive to the handover message. In some cases, the default configuration may include a default channel configuration and a default radio bearer configuration of the target base station 105. The UE handover manager 1015 may also receive a handover message at UE 115 indicating that a handover from a source base station 105 to a target base station 105 is to be performed, where the target base station 105 operates using a first RAT and the source base station 105 operates using a second RAT, and use a decoder for the second RAT to decode the handover message.

The UE handover manager 1015 may identify, in the handover message, an unambiguous indication that the wireless device 1005 is to establish a connection with the target base station 105 using the first RAT, and identify embedded information that is encoded according to an encoding scheme of the first RAT that is transparent to the source base station 105. The UE handover manager may initiate the handover to the target base station 105 responsive to the handover message. The UE handover manager 1015 may also receive a handover message at UE 115 indicating that a handover from a source base station 105 to a target base station 105 is to be performed, where the target base station 105 operates using a first RAT and the source base station 105 operates using a second RAT, identify, in the handover message, embedded information that is unparsable by a first parsing scheme of the second RAT, parsing the embedded information using a second parsing scheme of the first RAT, and initiate the handover to the target base station 105 responsive to the parsing the embedded information.

The UE handover manager 1015 may also receiving, at a UE 115, a handover command from the source base station 105, the handover command comprising an indication of a default configuration for establishing a connection with the target base station and an indication that the connection with the target base station is via a second RAT different from the first RAT. UE handover manager 1015 may apply, at the UE 115, a configuration associated with the second RAT based at least in part on the indication of the default configuration and the indication that the connection with the target base station is via the second RAT. UE handover manager 1015 may also initiate, by the UE 115, handover to the target base station 105 via the second RAT based at least in part on the configuration associated with the second RAT.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1335 described with reference to FIG. 13. The transmitter 1020 may include a single antenna or a set of antennae.

Figure 11:
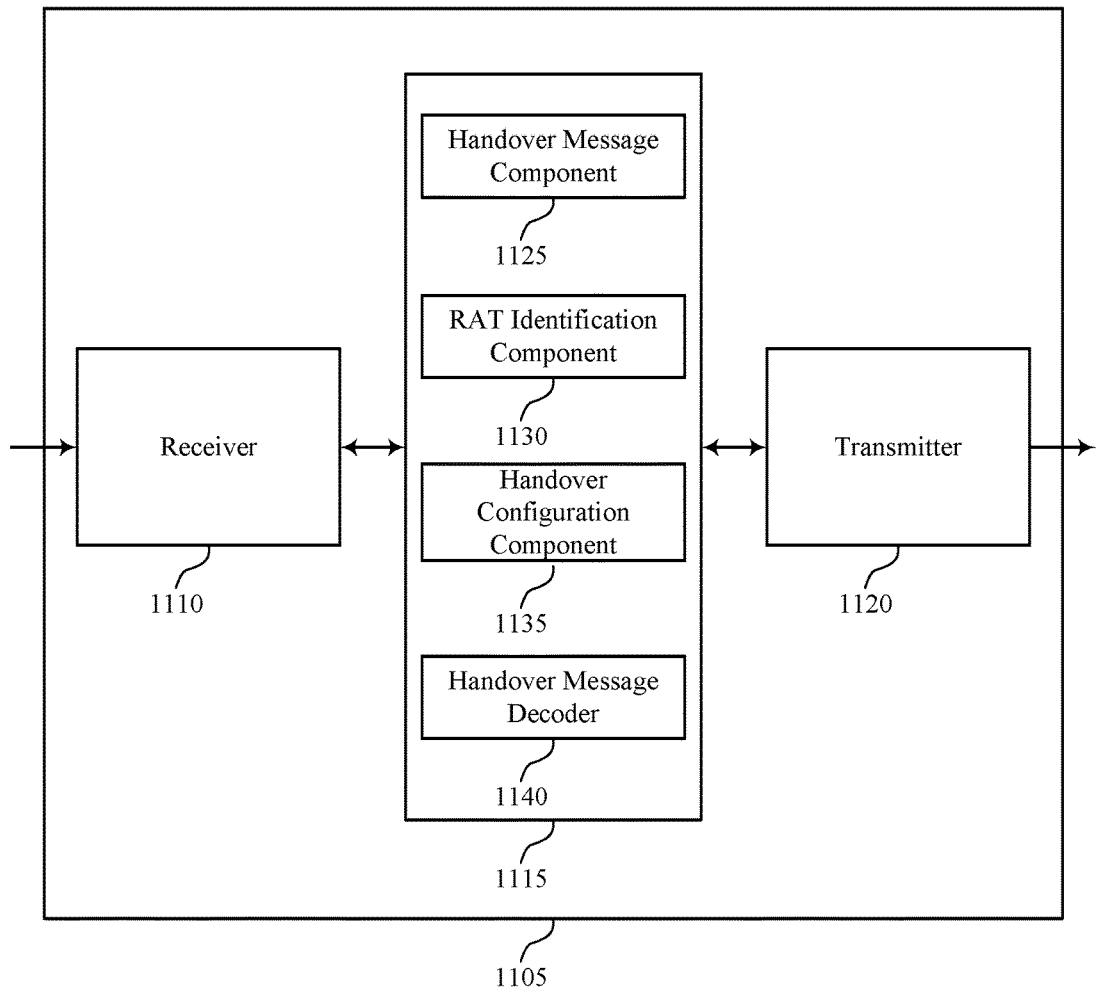

FIG. 11 shows a block diagram 1100 of a wireless device 1105 that supports coding of handover messages between nodes of different radio access technologies in accordance with aspects of the present disclosure. Wireless device 1105 may be an example of aspects of a wireless device 1005 or a UE 115 as described with reference to FIGS. 1 and 10. Wireless device 1105 may include receiver 1110, UE handover manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to coding of handover messages between nodes of different radio access technologies, etc.). Information may be passed on to other components of the device. The receiver 1110 may be an example of aspects of the transceiver 1335 described with reference to FIG. 13.

UE handover manager 1115 may be an example of aspects of the UE handover manager 1315 described with reference to FIG. 13. UE handover manager 1115 may also include handover message component 1125, RAT identification component 1130, handover configuration component 1135, and handover message decoder 1140.

Handover message component 1125 may receive a handover message at UE 115 indicating that a handover from a source base station 105 to a target base station 105 is to be performed, where the target base station 105 operates using a first RAT and the source base station 105 operates using a second RAT.

RAT identification component 1130 may identify, in the handover message, an indication that the wireless device 1105 is to use a default configuration (e.g., use a default channel configuration and a default radio bearer configuration) to establish a connection with a target base station 105 and an indication that the connection with the target base station 105 is to use the first RAT. RAT identification component 1130 may identify, in the handover message, an unambiguous indication that the wireless device 1105 is to establish a connection with the target base station 105 using the first RAT, and embedded information that is encoded according to an encoding scheme of the first RAT and that is transparent to a source base station 105. In some examples, RAT identification component 1130 may identify, in the handover message, embedded information that is unparsable by a first parsing scheme of the second RAT, and parse the embedded information using a second parsing scheme of the first RAT. In some cases, the second RAT includes a RAT that conforms to 3GPP standards and the first RAT includes a MF RAT that operates using a shared radio frequency spectrum band. In some cases, the indication that the connection with the target base station 105 is to use the first RAT includes an indication that a frequency of the target base station 105 is in a frequency band associated with the MF RAT. In some cases, the unambiguous indication indicates to the wireless device 1105 that the embedded information is to be decoded according to a decoding scheme of the first RAT. In some cases, the embedded information is contained in handover command, an RRC connection reconfiguration message, a mobility message, a CSFB message, or any other RRC message associated with the second RAT.

RAT identification component 1130 may also receive, at a UE 115, a handover command from the source base station 105, the handover command comprising an indication of a default configuration for establishing a connection with the target base station 105 and an indication that the connection with the target base station 105 is via a second RAT different from the first RAT.

Handover configuration component 1135 may initiate the handover to a target base station 105 responsive to the handover message and initiate the handover to the target base station 105 responsive to the parsing the embedded information. In some cases, the handover message includes an indication that one or more configuration parameters are to be used to establish the connection with the target base station 105. In some cases, the one or more configuration parameters are signaled in the handover message or are default values. In some cases, the one or more configuration parameters include one or more DMTC parameters.

Handover configuration component 1135 may apply, at the UE 115, a configuration associated with the second RAT based at least in part on the indication of the default configuration and the indication that the connection with the target base station is via the second RAT. The handover configuration component 1135 may initiate, by the UE 115, handover to the target base station 105 via the second RAT based at least in part on the configuration associated with the second RAT.

Handover message decoder 1140 may use a decoder for the second RAT to decode the handover message. In some cases, the identifying includes attempting to decode the embedded information using the second parsing scheme, identifying a parsing error, and falling back to the second parsing scheme. In some cases, the first parsing scheme includes a 3GPP parsing scheme and the embedded information generates an ASN.1 error.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may include a single antenna or a set of antennae.

Figure 12:
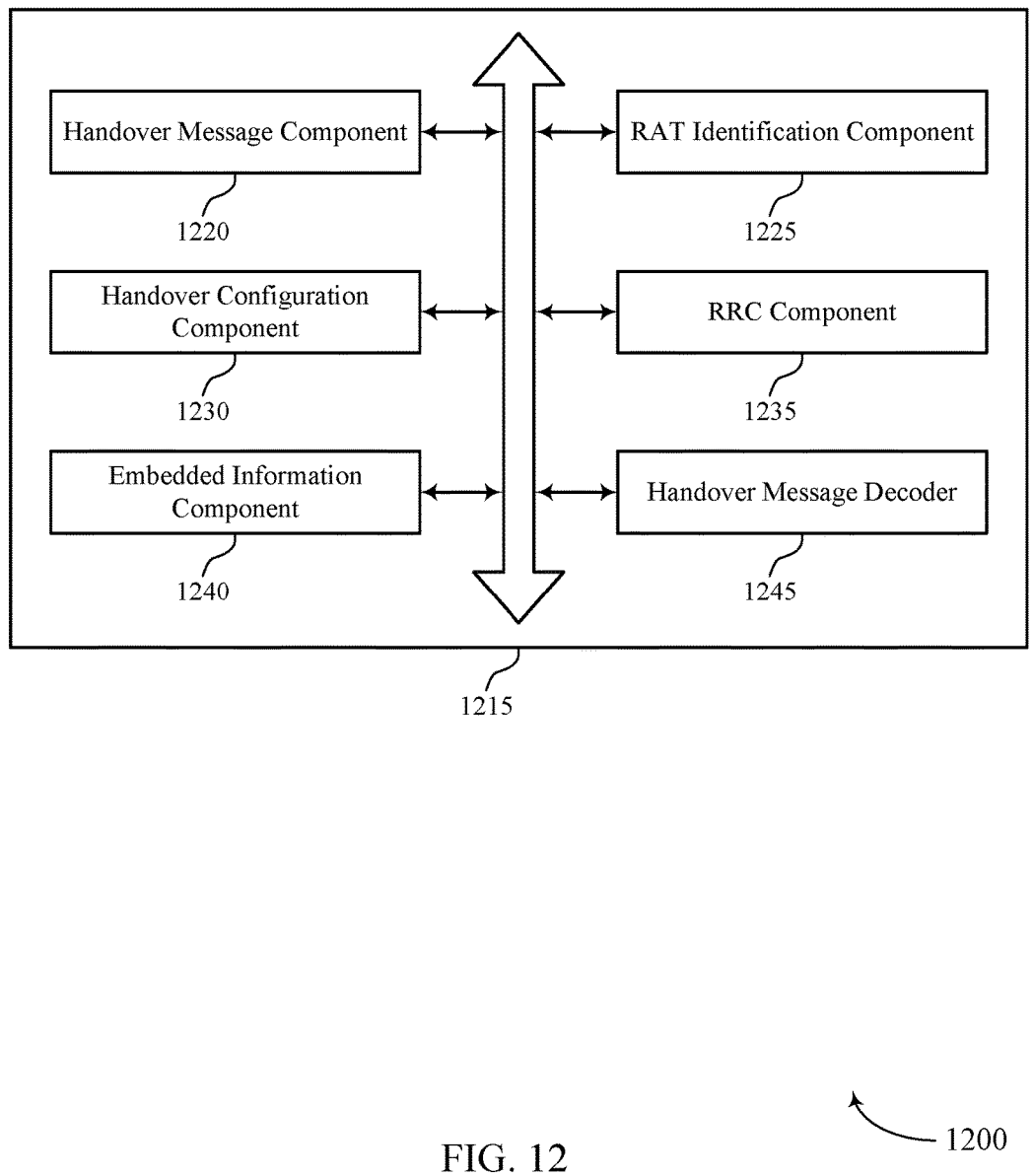

FIG. 12 shows a block diagram 1200 of a UE handover manager 1215 that supports coding of handover messages between nodes of different radio access technologies in accordance with aspects of the present disclosure. The UE handover manager 1215 may be an example of aspects of a UE handover manager 1315 described with reference to FIGS. 10, 11, and 13. The UE handover manager 1215 may include handover message component 1220, RAT identification component 1225, handover configuration component 1230, handover message decoder 1235, RRC component 1240, and embedded information component 1245. Each of these modules may communicate, directly or indirectly, with one another (e.g., via one or more buses).

Handover message component 1220 may receive a handover message at UE 115 indicating that a handover from a source base station 105 to a target base station 105 is to be performed, where the target base station 105 operates using a first RAT and the source base station 105 operates using a second RAT. In some cases, handover message component 1220 may receive the handover command from the source base station 105 via a dedicated control channel of the first RAT. For example, the dedicated control channel may include an RRC channel and the first RAT may include LTE.

Handover message component 1220 may also receive a handover message that complies with a protocol of the first RAT, wherein the first RAT may include a 3GPP RAT. For example, the handover command may include a flag indicator corresponding to the second RAT and the second RAT may include a MulteFire RAT that operates using an unlicensed radio frequency spectrum band.

RAT identification component 1225 may identify, in the handover message, an indication that a UE 115 is to use a default configuration (e.g., use a default channel configuration and a default radio bearer configuration) to establish a connection with a target base station 105 and an indication that the connection with the target base station 105 is to use the first RAT. RAT identification component 1225 may identify, in the handover message, an unambiguous indication that the UE 115 is to establish a connection with the target base station 105 using the first RAT, and embedded information that is encoded according to an encoding scheme of the first RAT and that is transparent to a source base station 105. In some examples, RAT identification component 1225 may identify, in the handover message, embedded information that is unparsable by a first parsing scheme of the second RAT, and parse the embedded information using a second parsing scheme of the first RAT. In some cases, the second RAT includes a RAT that conforms to 3GPP standards and the first RAT includes a MF RAT that operates using a shared radio frequency spectrum band. In some cases, the indication that the connection with the target base station 105 is to use the first RAT includes an indication that a frequency of the target base station 105 is in a frequency band associated with the MF RAT. In some cases, the unambiguous indication, indicates to the UE 115 that the embedded information is to be decoded according to a decoding scheme of the first RAT. In some cases, the embedded information is contained in handover command, an RRC connection reconfiguration message, a mobility message, a CSFB message, or any other RRC message associated with the second RAT.

RAT identification component 1225 may also receive, at a UE 115, a handover command from the source base station 105, the handover command comprising an indication of a default configuration for establishing a connection with the target base station 105 and an indication that the connection with the target base station 105 is via a second RAT different from the first RAT. In some cases, RAT identification component 1225 may receive at a UE 115 an indication that a frequency of the target base station operates using a frequency band associated with the second RAT.

Handover configuration component 1230 may initiate the handover to a target base station 105 responsive to the handover message and initiate the handover to the target base station 105 responsive to parsing the embedded information. In some cases, the handover message includes an indication that one or more configuration parameters are to be used to establish the connection with the target base station 105. In some cases, the one or more configuration parameters are signaled in the handover message or are default values. In other cases, the one or more configuration parameters include one or more DMTC parameters.

Handover configuration component 1230 may also apply, at the UE 115, a configuration associated with the second RAT based at least in part on the indication of the default configuration and the indication that the connection with the target base station is via the second RAT. The handover configuration component 1135 may initiate, by the UE 115, handover to the target base station 105 via the second RAT based at least in part on the configuration associated with the second RAT. Handover configuration component 1230 may also determine, by the UE 115, a set of configuration parameters for the connection with the target base station 105 based at least in part on the handover command, wherein the configuration is applied based at least in part on the set of configuration parameters. In some examples, the set of configuration parameters may include one or more default values associated with the second RAT, one or more DMTC parameters associated with the second RAT, or a combination thereof.

Handover message decoder 1235 may use a decoder for the second RAT to decode the handover message. In some cases, the identifying includes attempting to decode the embedded information using the second parsing scheme, identifying a parsing error, and falling back to the second parsing scheme. In some cases, the first parsing scheme includes a 3GPP parsing scheme and the embedded information generates an ASN.1 error.

RRC component 1240 may identify that a UE 115 is to use a default configuration, such as a fullConfig flag in an RRCConnectionReconfiguration message as defined by the 3GPP standards. Embedded information component 1245 may identify that the unambiguous indication includes a condition that is improperly fulfilled according to proper conditions of the second RAT.

Figure 13:
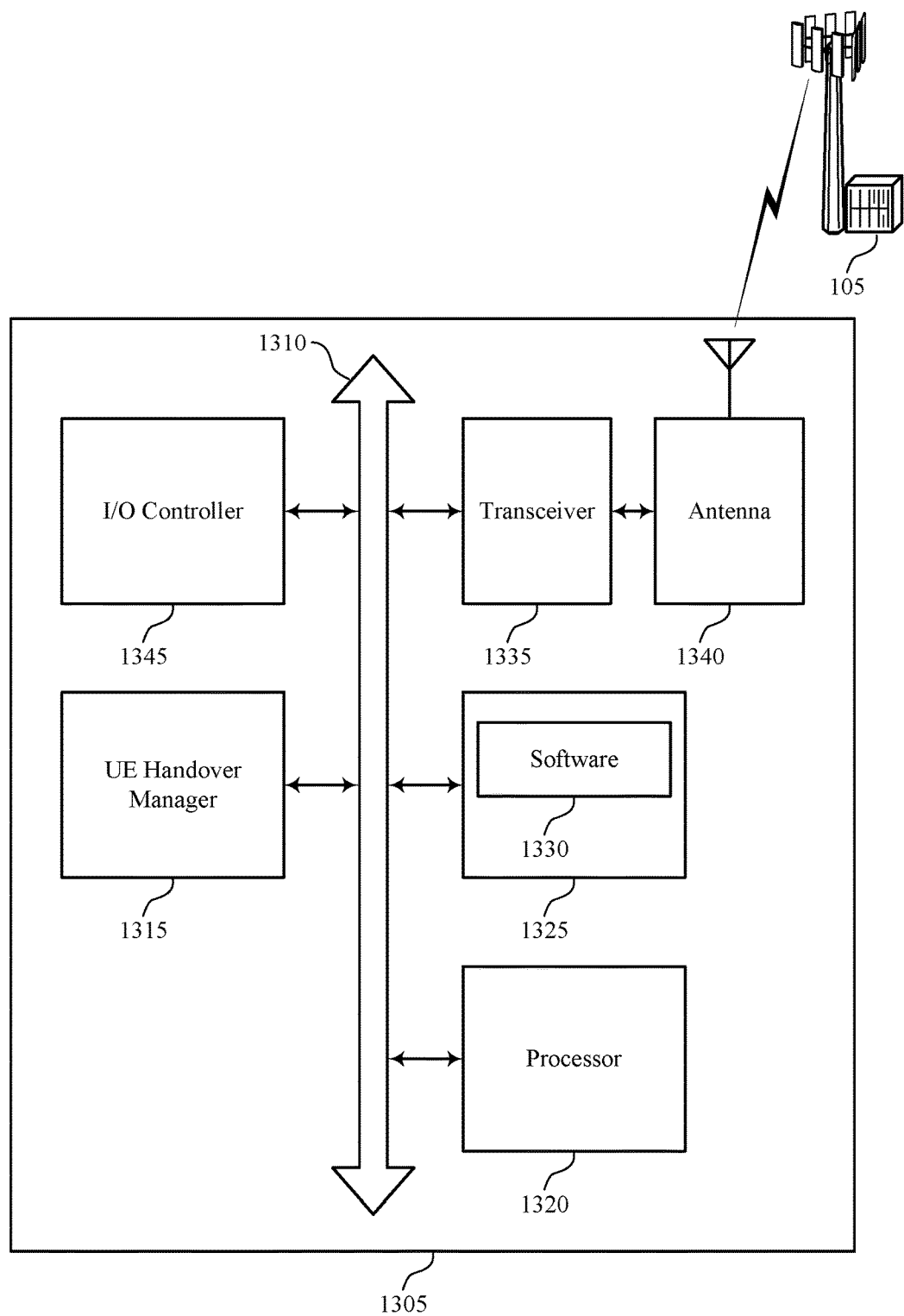
FIG. 13 illustrates a block diagram of a system including a device that supports coding of handover messages between nodes of different RATs in accordance with aspects of the present disclosure.

FIG. 13 shows a diagram of a system 1300 including a device 1305 that supports coding of handover messages between nodes of different radio access technologies in accordance with aspects of the present disclosure. Device 1305 may be an example of or include the components of UE 115 as described with reference to FIG. 1. Device 1305 may include components for bi-directional voice and data communications including components for transmitting and receiving communications, including UE handover manager 1315, processor 1320, memory 1325, software 1330, transceiver 1335, antenna 1340, and I/O controller 1345. These components may be in electronic communication via one or more busses (e.g., bus 1310). Device 1305 may communicate wirelessly with one or more base stations 105.

Processor 1320 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting coding of handover messages between nodes of different radio access technologies).

Memory 1325 may include RAM and ROM. The memory 1325 may store computer-readable, computer-executable software 1330 including instructions that, when executed, cause the processor to perform various functions described herein. In some cases, the memory 1325 may contain, among other things, a BIOS which may control basic hardware and/or software operation such as the interaction with peripheral components or devices.

Software 1330 may include code to implement aspects of the present disclosure, including code to support coding of handover messages between nodes of different radio access technologies. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas.

In some cases, the device 1305 may include a single antenna 1340. However, in some cases the device may have more than one antenna 1340, which may be capable of concurrently transmitting or receiving multiple wireless transmissions.

I/O controller 1345 may manage input and output signals for device 1305. I/O controller 1345 may also manage peripherals not integrated into device 1305. In some cases, I/O controller 1345 may represent a physical connection or port to an external peripheral. In some cases, I/O controller 1345 may utilize an operating system such as iOS®, ANDROID®, MS-DOS®, MS-WINDOWS®, OS/2®, UNIX®, LINUX®, or another known operating system.

Figure 14:
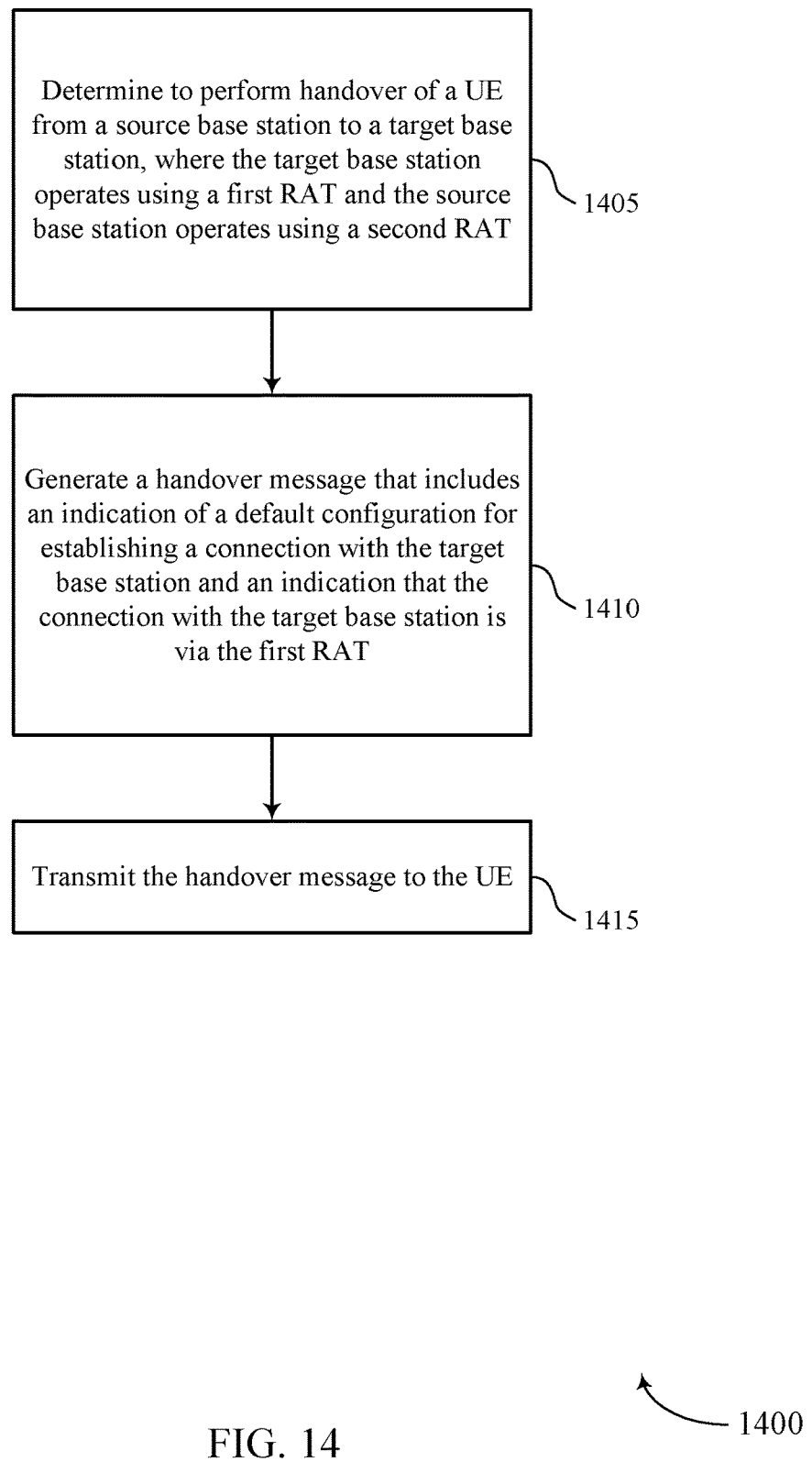
FIGS. 14 through 21 show flowcharts illustrating methods for coding of handover messages between nodes of different RATs in accordance with aspects of the present disclosure.

FIG. 14 shows a flowchart illustrating a method 1400 for coding of handover messages between nodes of different radio access technologies in accordance with aspects of the present disclosure. The operations of method 1400 may be implemented by a base station 105 or its components as described herein. For example, the operations of method 1400 may be performed by a base station handover manager as described with reference to FIGS. 6 through 9. In some examples, a base station 105 may execute a set of codes to control the functional elements of the device to perform the functions described below. Additionally or alternatively, the base station 105 may perform aspects of the functions described below using special-purpose hardware.

At block 1405 the base station 105 may identify that a handover of a UE 115 from a source base station 105 to a target base station 105 is to be performed, wherein the target base station 105 operates using a first RAT and the source base station 105 operates using a second RAT. The operations of block 1405 may be performed according to the methods described with reference to FIGS. 1 through 5. In some examples, aspects of the operations of block 1405 may be performed by a handover identification component as described with reference to FIGS. 6 through 9.

At block 1410 the base station 105 may identify a handover message to be transmitted to the UE 115, the handover message including an indication that the UE 115 is to use a default configuration (e.g., use a default channel configuration and a default radio bearer configuration) to establish a connection with the target base station 105 and an indication that the connection with the target base station 105 is to use the first RAT. The operations of block 1410 may be performed according to the methods described with reference to FIGS. 1 through 5. In some examples, aspects of the operations of block 1410 may be performed by a handover message component as described with reference to FIGS. 6 through 9.

At block 1415 the base station 105 may transmit the handover message to the UE 115. The operations of block 1415 may be performed according to the methods described with reference to FIGS. 1 through 5. In some examples, aspects of the operations of block 1415 may be performed by a transmitter as described with reference to FIGS. 6 through 9.

Figure 15:
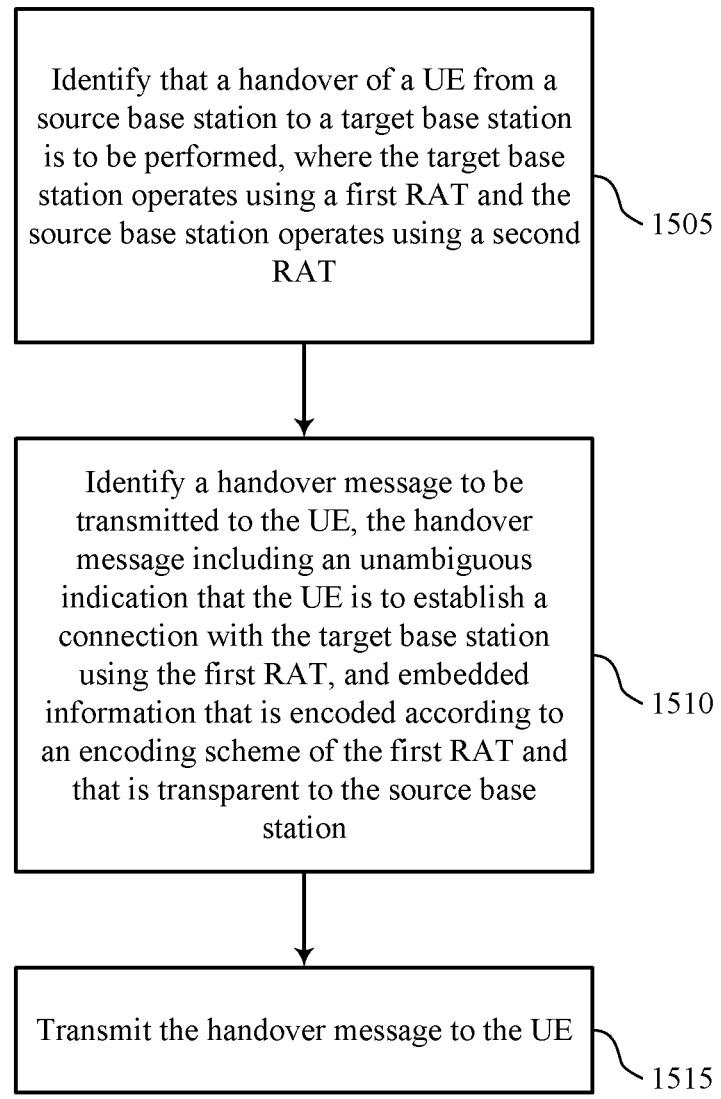

FIG. 15 shows a flowchart illustrating a method 1500 for coding of handover messages between nodes of different radio access technologies in accordance with aspects of the present disclosure. The operations of method 1500 may be implemented by a base station 105 or its components as described herein. For example, the operations of method 1500 may be performed by a base station handover manager as described with reference to FIGS. 6 through 9. In some examples, a base station 105 may execute a set of codes to control the functional elements of the device to perform the functions described below. Additionally or alternatively, the base station 105 may perform aspects of the functions described below using special-purpose hardware.

At block 1505 the base station 105 may identify that a handover of a UE 115 from a source base station 105 to a target base station 105 is to be performed, wherein the target base station 105 operates using a first RAT and the source base station 105 operates using a second RAT. The operations of block 1505 may be performed according to the methods described with reference to FIGS. 1 through 5. In some examples, aspects of the operations of block 1505 may be performed by a handover identification component as described with reference to FIGS. 6 through 9.

At block 1510 the base station 105 may identify a handover message to be transmitted to the UE 115, the handover message including an unambiguous indication that the UE 115 is to establish a connection with the target base station 105 using the first RAT, and embedded information that is encoded according to an encoding scheme of the first RAT and that is transparent to the source base station 105. The operations of block 1510 may be performed according to the methods described with reference to FIGS. 1 through 5. In some examples, aspects of the operations of block 1510 may be performed by a handover message component as described with reference to FIGS. 6 through 9.

At block 1515 the base station 105 may transmit the handover message to the UE 115. The operations of block 1515 may be performed according to the methods described with reference to FIGS. 1 through 5. In some examples, aspects of the operations of block 1515 may be performed by a transmitter as described with reference to FIGS. 6 through 9.

Figure 16:
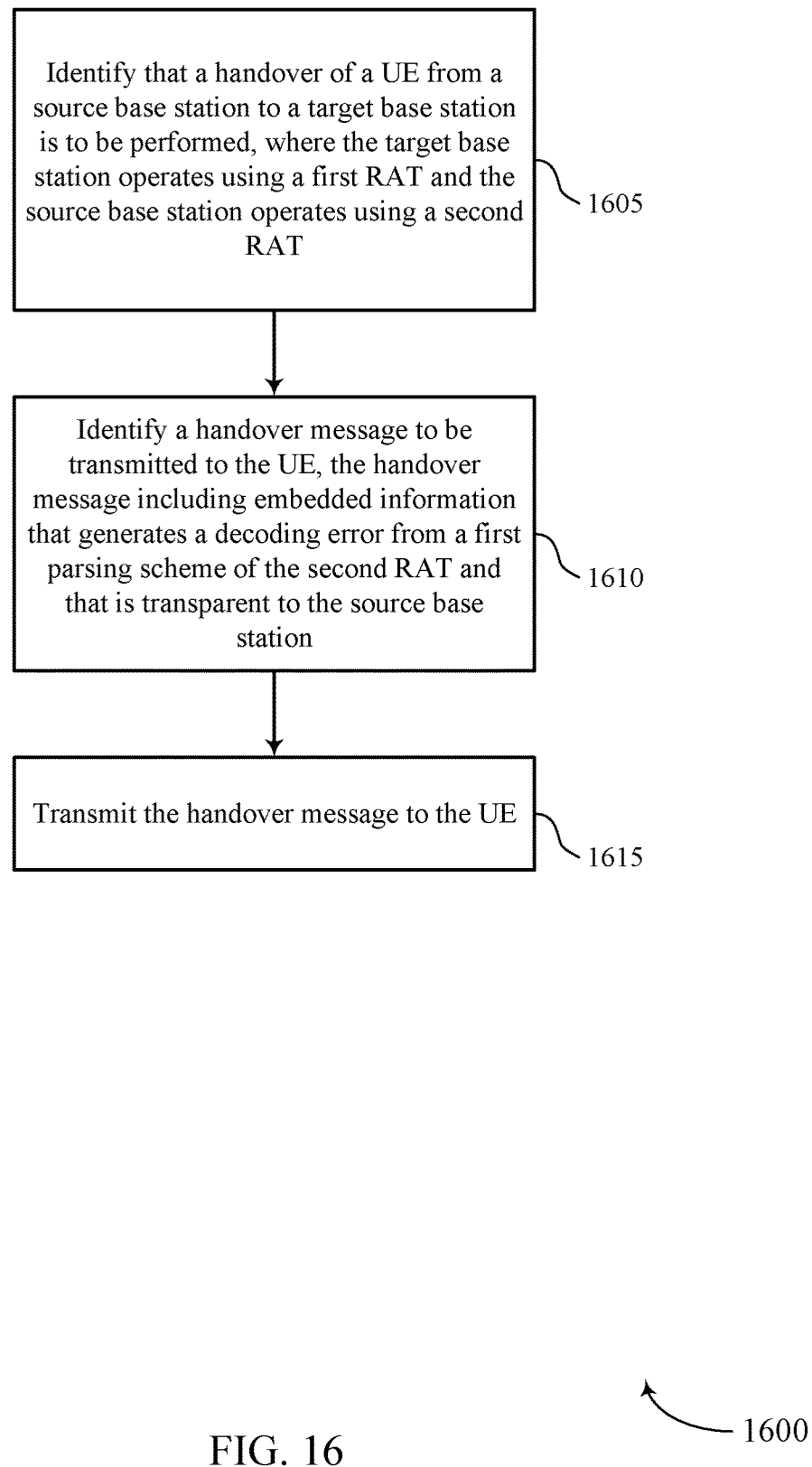

FIG. 16 shows a flowchart illustrating a method 1600 for coding of handover messages between nodes of different radio access technologies in accordance with aspects of the present disclosure. The operations of method 1600 may be implemented by a base station 105 or its components as described herein. For example, the operations of method 1600 may be performed by a base station handover manager as described with reference to FIGS. 6 through 9. In some examples, a base station 105 may execute a set of codes to control the functional elements of the device to perform the functions described below. Additionally or alternatively, the base station 105 may perform aspects of the functions described below using special-purpose hardware.

At block 1605 the base station 105 may identify that a handover of a UE 115 from a source base station 105 to a target base station 105 is to be performed, wherein the target base station 105 operates using a first RAT and the source base station 105 operates using a second RAT. The operations of block 1605 may be performed according to the methods described with reference to FIGS. 1 through 5. In some examples, aspects of the operations of block 1605 may be performed by a handover identification component as described with reference to FIGS. 6 through 9.

At block 1610 the base station 105 may identify a handover message to be transmitted to the UE 115, the handover message including embedded information that generates a decoding error from a first parsing scheme of the second RAT and that is transparent to the source base station 105. The operations of block 1610 may be performed according to the methods described with reference to FIGS. 1 through 5. In some examples, aspects of the operations of block 1610 may be performed by a handover message component as described with reference to FIGS. 6 through 9.

At block 1615 the base station 105 may transmit the handover message to the UE 115. The operations of block 1615 may be performed according to the methods described with reference to FIGS. 1 through 5. In some examples, aspects of the operations of block 1615 may be performed by a transmitter as described with reference to FIGS. 6 through 9.

Figure 17:
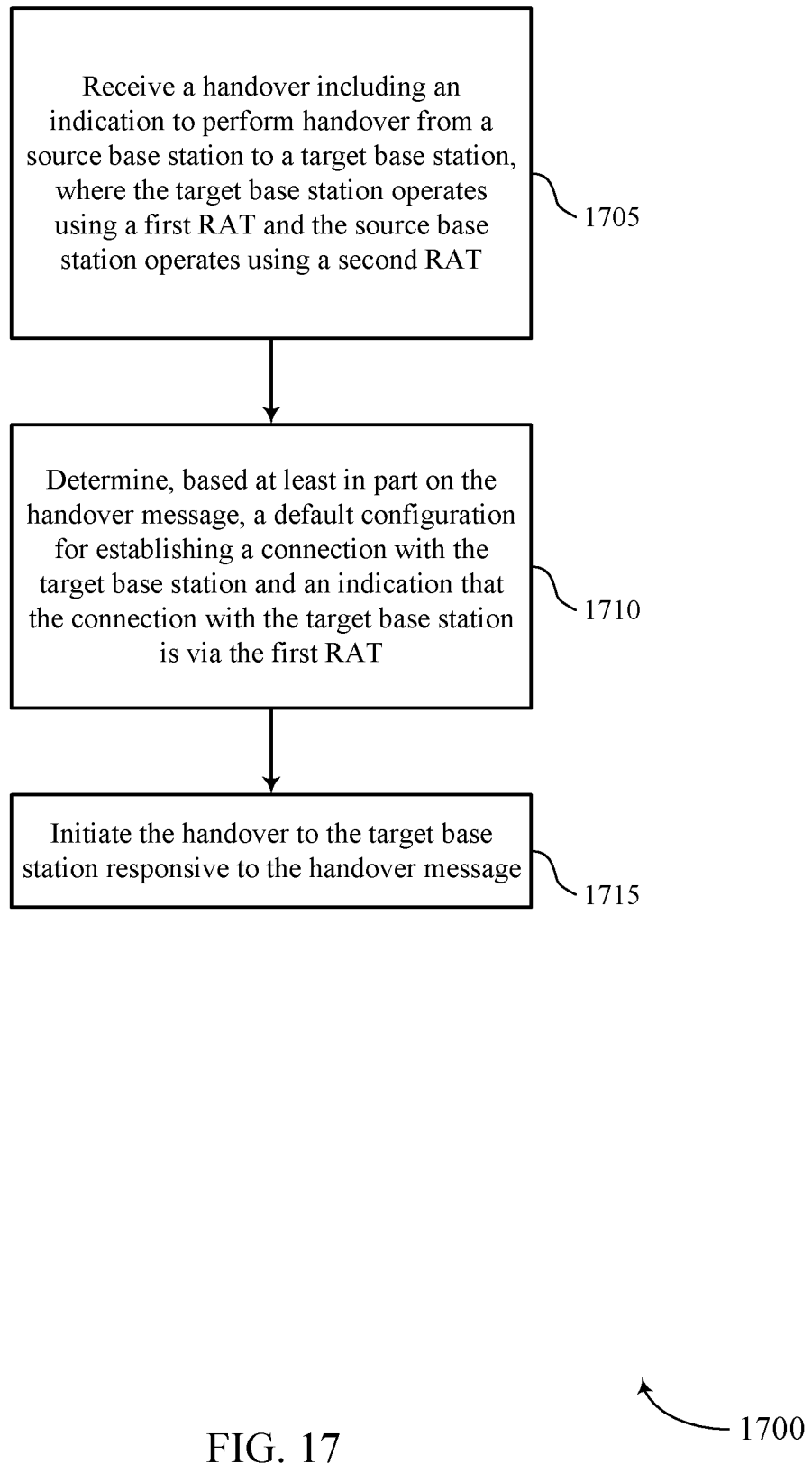

FIG. 17 shows a flowchart illustrating a method 1700 for coding of handover messages between nodes of different radio access technologies in accordance with aspects of the present disclosure. The operations of method 1700 may be implemented by a UE 115 or its components as described herein. For example, the operations of method 1700 may be performed by a UE handover manager as described with reference to FIGS. 10 through 13. In some examples, a UE 115 may execute a set of codes to control the functional elements of the device to perform the functions described below. Additionally or alternatively, the UE 115 may perform aspects of the functions described below using special-purpose hardware.

At block 1705 the UE 115 may receive a handover message indicating that a handover from a source base station 105 to a target base station 105 is to be performed, wherein the target base station 105 operates using a first RAT and the source base station 105 operates using a second RAT. The operations of block 1705 may be performed according to the methods described with reference to FIGS. 1 through 5. In some examples, aspects of the operations of block 1705 may be performed by a handover message component as described with reference to FIGS. 10 through 13.

At block 1710 the UE 115 may identify, in the handover message, an indication that the UE 115 is to use a default configuration (e.g., use a default channel configuration and a default radio bearer configuration) to establish a connection with the target base station 105 and an indication that the connection with the target base station 105 is to use the first RAT. The operations of block 1710 may be performed according to the methods described with reference to FIGS. 1 through 5. In some examples, aspects of the operations of block 1710 may be performed by a RAT identification component as described with reference to FIGS. 10 through 13.

At block 1715 the UE 115 may initiate the handover to the target base station 105 responsive to the handover message. The operations of block 1715 may be performed according to the methods described with reference to FIGS. 1 through 5. In some examples, aspects of the operations of block 1715 may be performed by a handover configuration component as described with reference to FIGS. 10 through 13.

Figure 18:
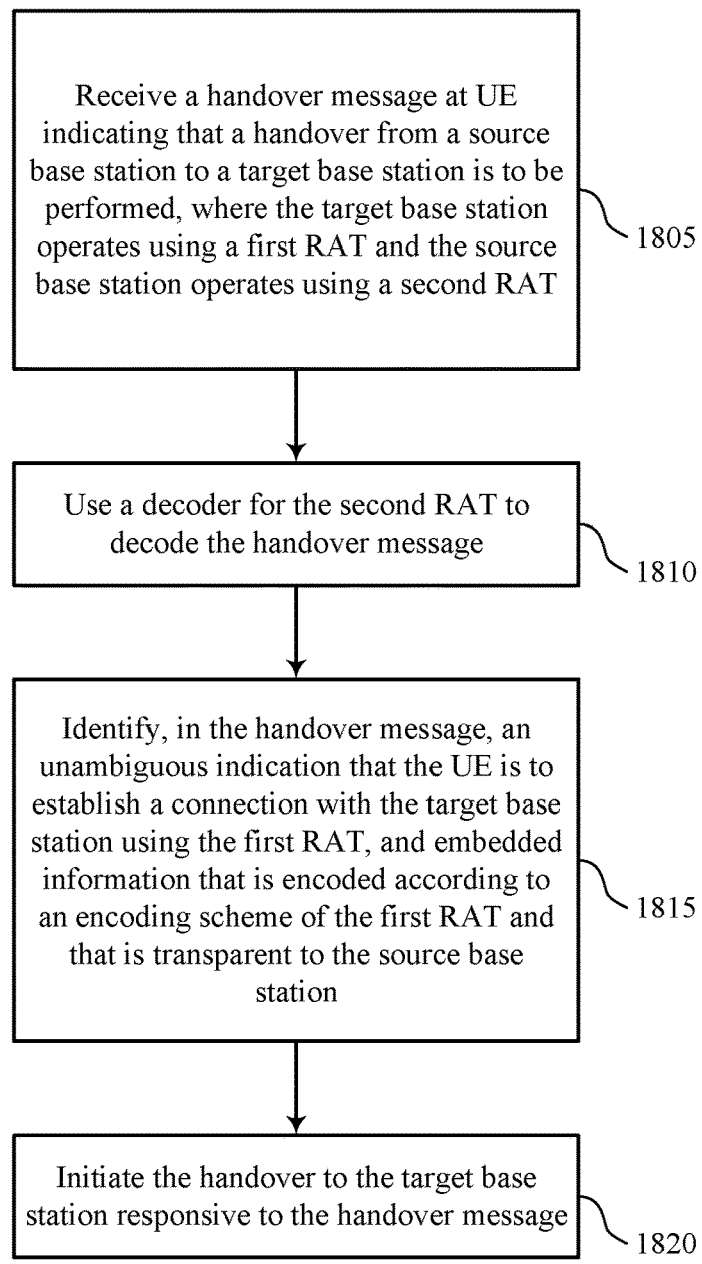

FIG. 18 shows a flowchart illustrating a method 1800 for coding of handover messages between nodes of different radio access technologies in accordance with aspects of the present disclosure. The operations of method 1800 may be implemented by a UE 115 or its components as described herein. For example, the operations of method 1800 may be performed by a UE handover manager as described with reference to FIGS. 10 through 13. In some examples, a UE 115 may execute a set of codes to control the functional elements of the device to perform the functions described below. Additionally or alternatively, the UE 115 may perform aspects of the functions described below using special-purpose hardware.

At block 1805 the UE 115 may receive a handover message indicating that a handover from a source base station 105 to a target base station 105 is to be performed, wherein the target base station 105 operates using a first RAT and the source base station 105 operates using a second RAT. The operations of block 1805 may be performed according to the methods described with reference to FIGS. 1 through 5. In some examples, aspects of the operations of block 1805 may be performed by a handover message component as described with reference to FIGS. 10 through 13.

At block 1810 the UE 115 may use a decoder for the second RAT to decode the handover message. The operations of block 1810 may be performed according to the methods described with reference to FIGS. 1 through 5. In some examples, aspects of the operations of block 1810 may be performed by a handover message decoder as described with reference to FIGS. 10 through 13.

At block 1815 the UE 115 may identify, in the handover message, an unambiguous indication that the UE 115 is to establish a connection with the target base station 105 using the first RAT, and embedded information that is encoded according to an encoding scheme of the first RAT and that is transparent to the source base station 105. The operations of block 1815 may be performed according to the methods described with reference to FIGS. 1 through 5. In some examples, aspects of the operations of block 1815 may be performed by a RAT identification component as described with reference to FIGS. 10 through 13.

At block 1820 the UE 115 may initiate the handover to the target base station 105 responsive to the handover message. The operations of block 1820 may be performed according to the methods described with reference to FIGS. 1 through 5. In some examples, aspects of the operations of block 1820 may be performed by a handover configuration component as described with reference to FIGS. 10 through 13.

Figure 19:
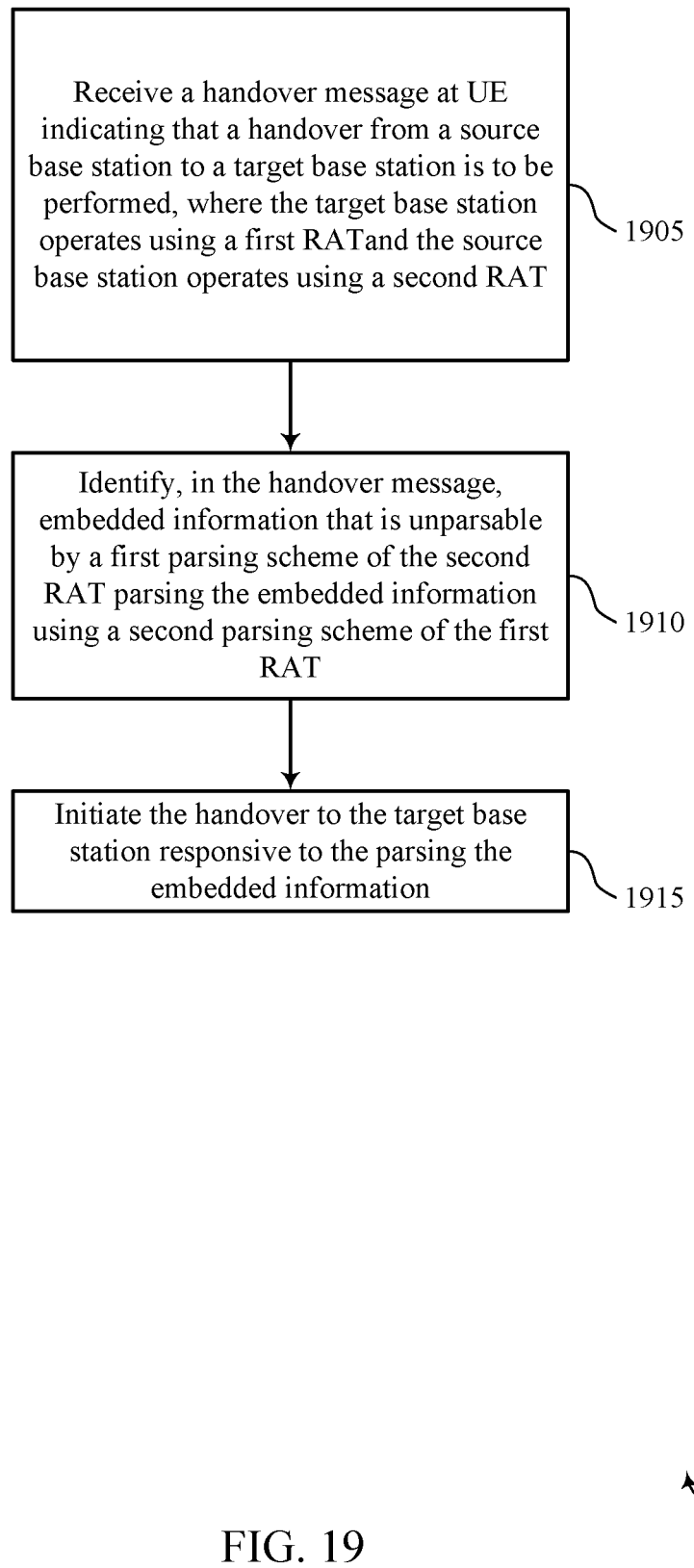

FIG. 19 shows a flowchart illustrating a method 1900 for coding of handover messages between nodes of different radio access technologies in accordance with aspects of the present disclosure. The operations of method 1900 may be implemented by a UE 115 or its components as described herein. For example, the operations of method 1900 may be performed by a UE handover manager as described with reference to FIGS. 10 through 13. In some examples, a UE 115 may execute a set of codes to control the functional elements of the device to perform the functions described below. Additionally or alternatively, the UE 115 may perform aspects of the functions described below using special-purpose hardware.

At block 1905 the UE 115 may receive a handover message indicating that a handover from a source base station 105 to a target base station 105 is to be performed, wherein the target base station 105 operates using a first RAT and the source base station 105 operates using a second RAT. The operations of block 1905 may be performed according to the methods described with reference to FIGS. 1 through 5. In some examples, aspects of the operations of block 1905 may be performed by a handover message component as described with reference to FIGS. 10 through 13.

At block 1910 the UE 115 may identify, in the handover message, embedded information that is unparsable by a first parsing scheme of the second RAT, and parse the embedded information using a second parsing scheme of the first RAT. The operations of block 1910 may be performed according to the methods described with reference to FIGS. 1 through 5. In some examples, aspects of the operations of block 1910 may be performed by a RAT identification component as described with reference to FIGS. 10 through 13.

At block 1915 the UE 115 may initiate the handover to the target base station 105 responsive to the parsing the embedded information. The operations of block 1915 may be performed according to the methods described with reference to FIGS. 1 through 5. In some examples, aspects of the operations of block 1915 may be performed by a handover configuration component as described with reference to FIGS. 10 through 13.

Figure 20:
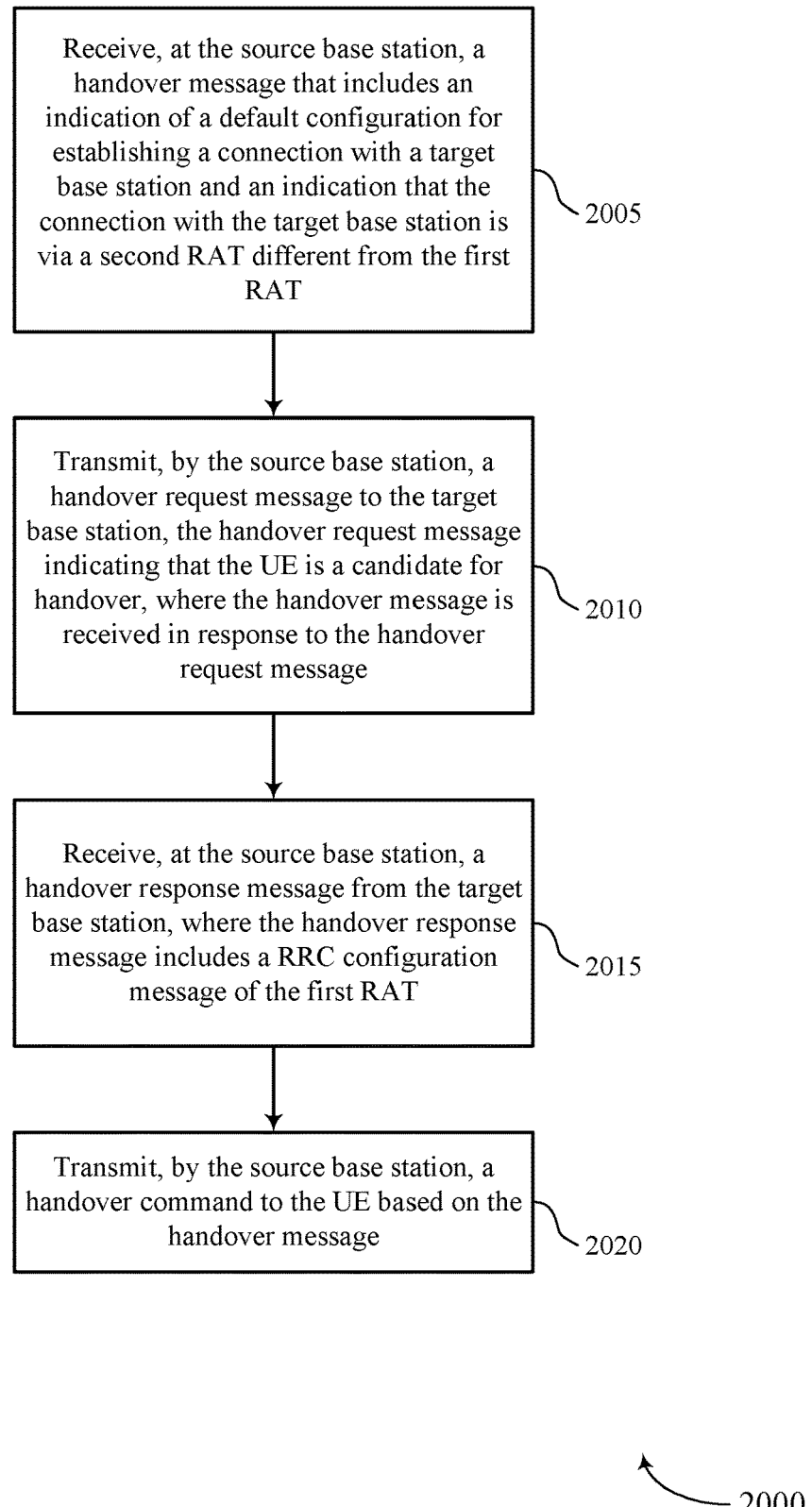

FIG. 20 shows a flowchart illustrating a method 2000 for coding of handover messages between nodes of different radio access technologies in accordance with aspects of the present disclosure. The operations of method 2000 may be implemented by a base station 105 or its components as described herein. For example, the operations of method 2000 may be performed by a base station handover manager as described with reference to FIGS. 6 through 9. In some examples, a base station 105 may execute a set of codes to control the functional elements of the device to perform the functions described below. Additionally or alternatively, the base station 105 may perform aspects of the functions described below using special-purpose hardware.

At 2005 the source base station 105 may receive a handover message that includes an indication of a default configuration for establishing a connection with a target base station 105 and an indication that the connection with the target base station 105 is via a second RAT different from the first RAT. The operations of 2005 may be performed according to the methods described herein. In certain examples, aspects of the operations of 2005 may be performed by a handover message component as described with reference to FIGS. 7 and 8.

At 2010 the source base station 105 may transmit a handover request message to the target base station 105, the handover request message indicating that the UE 115 is a candidate for handover, wherein the handover message is received in response to the handover request message. The operations of 2010 may be performed according to the methods described herein. In certain examples, aspects of the operations of 2010 may be performed by a handover identification component as described with reference to FIG. 8.

At 2015 the source base station 105 may receive a handover response message from the target base station 105, wherein the handover response message comprises an RRC configuration message of the first RAT. The operations of 2015 may be performed according to the methods described herein. In certain examples, aspects of the operations of 2015 may be performed by an RRC component as described with reference to FIG. 8.

At 2020 the source base station 105 may transmit, a handover command to the UE 115 based at least in part on the handover message. The operations of 2020 may be performed according to the methods described herein. In certain examples, aspects of the operations of 2020 may be performed by a handover message component as described with reference to FIGS. 7 and 8.

Figure 21:
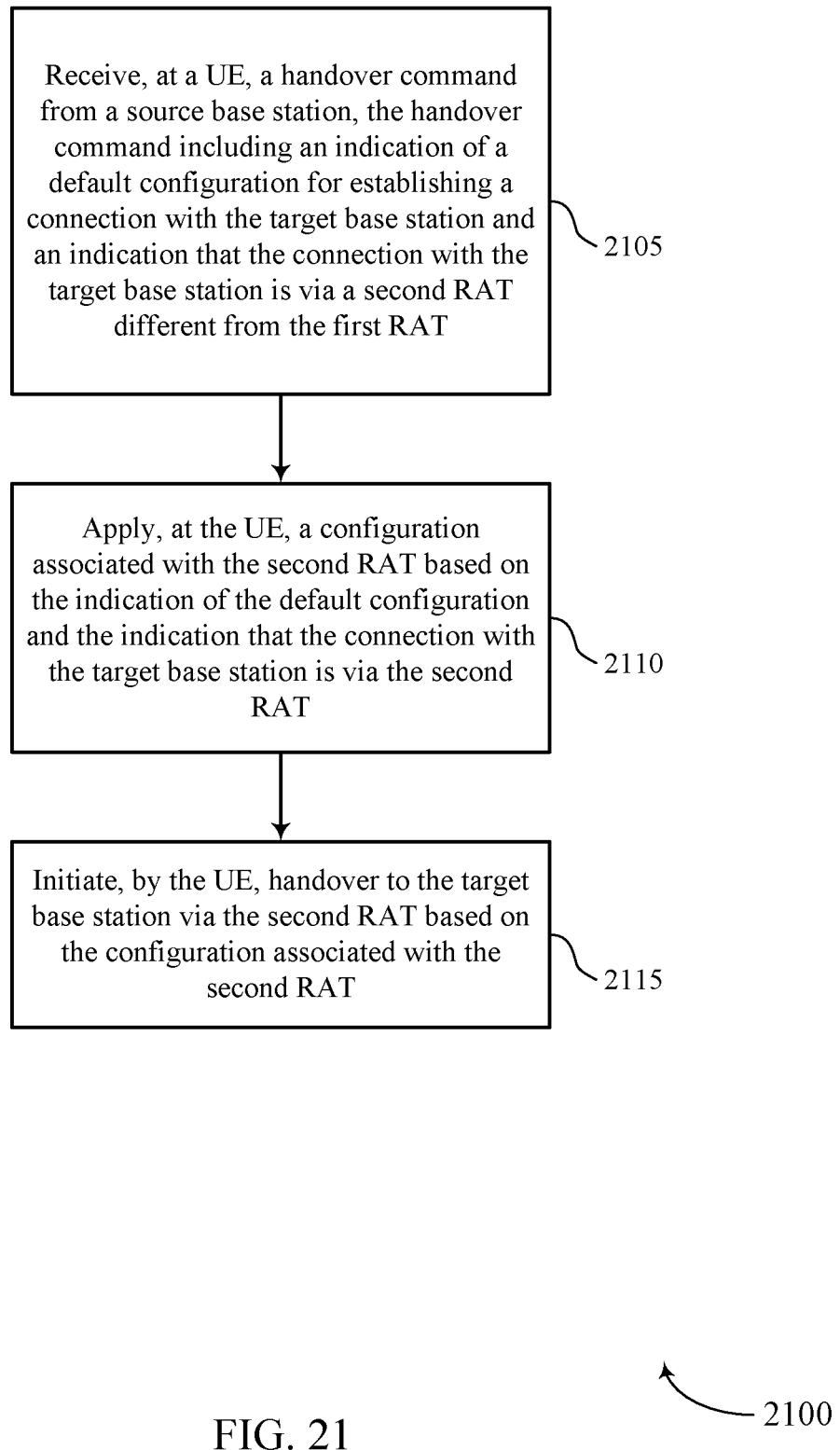

FIG. 21 shows a flowchart illustrating a method 2100 for coding of handover messages between nodes of different radio access technologies in accordance with aspects of the present disclosure. The operations of method 2100 may be implemented by a UE 115 or its components as described herein. For example, the operations of method 2100 may be performed by a UE handover manager as described with reference to FIGS. 10 through 13. In some examples, a UE 115 may execute a set of codes to control the functional elements of the device to perform the functions described below. Additionally or alternatively, the UE 115 may perform aspects of the functions described below using special-purpose hardware.

At 2105 the UE 115 may receive a handover command from a source base station 105, the handover command comprising an indication of a default configuration for establishing a connection with the target base station 105 and an indication that the connection with the target base station 105 is via a second RAT different from the first RAT. The operations of 2105 may be performed according to the methods described herein. In certain examples, aspects of the operations of 2105 may be performed by a RAT identification component as described with reference to FIGS. 11 and 12.

At 2110 the UE 115 may apply a configuration associated with the second RAT based at least in part on the indication of the default configuration and the indication that the connection with the target base station 105 is via the second RAT. The operations of 2110 may be performed according to the methods described herein. In certain examples, aspects of the operations of 2110 may be performed by a handover configuration component as described with reference to FIGS. 11 and 12.

At 2115 the UE 115 may initiate handover to the target base station 105 via the second RAT based at least in part on the configuration associated with the second RAT. The operations of 2115 may be performed according to the methods described herein. In certain examples, aspects of the operations of 2115 may be performed by a handover configuration component as described with reference to FIGS. 11 and 12.

It should be noted that the methods described above describe possible implementations, and that the operations and the steps may be rearranged or otherwise modified and that other implementations are possible. Additional, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as GSM.

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of UMTS. 3GPP LTE and LTE-A are releases of UMTS that use E-UTRA. UTRA, E-UTRA, UMTS, LTE, LTE-A, NR, and GSM are described in documents from the organization named 3GPP. CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE or an NR system may be described for purposes of example, and LTE or NR terminology may be used in much of the description, the techniques described herein are applicable beyond LTE or NR applications.

In LTE/LTE-A networks, including such networks described herein, the term eNB may be generally used to describe the base stations. The wireless communications system or systems described herein may include a heterogeneous LTE/LTE-A or NR network in which different types of eNBs provide coverage for various geographical regions. For example, each eNB, gNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), next generation NodeB (gNB), Home NodeB, a Home eNodeB, or some other suitable terminology. The geographic coverage area for a base station may be divided into sectors making up a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Additionally, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for establishing a wireless connection with a user equipment (UE) in a communication system including a source base station operating according to a first radio access technology (RAT), the method comprising:
    receiving, at the source base station, a handover message from a target base station, the handover message comprising an indication of a default configuration for establishing a connection with the target base station and an indication that the connection with the target base station is via a second RAT different from the first RAT, wherein the handover message comprises a flag indicator corresponding to the second RAT;
    configuring a handover command that includes the flag indicator corresponding to the second RAT; and
    transmitting, by the source base station and to the UE, the handover command that includes the flag indicator corresponding to the second RAT based at least in part on the handover message.

2. The method of claim 1, further comprising:
    transmitting, by the source base station, a handover request message to the target base station, the handover request message indicating that the UE is a candidate for handover, wherein the handover message is received in response to the handover request message.

3. The method of claim 2, further comprising:
    receiving, at the source base station, a handover response message from the target base station, wherein the handover response message comprises a radio resource control (RRC) configuration message of the first RAT.

4. The method of claim 3, wherein the handover response message comprises the handover message.

5. The method of claim 1, further comprising:
    configuring, by the source base station, the handover command based at least in part on the handover message, wherein the handover command complies with a protocol of the first RAT and the first RAT comprises a 3rd generation partnership project (3GPP) RAT.

6. The method of claim 5, wherein the second RAT comprises a MulteFire RAT that operates using an unlicensed radio frequency spectrum band.

7. The method of claim 1, wherein transmitting the handover command to the UE comprises:
    transmitting the handover command that comprises the handover message via a dedicated control channel of the first RAT.

8. The method of claim 7, wherein the dedicated control channel comprises a radio resource control (RRC) channel and the first RAT comprises Long Term Evolution (LTE).

9. The method of claim 1, wherein receiving the handover message comprises:
    receiving an indication that a frequency of the target base station operates using a frequency band associated with the second RAT.

10. The method of claim 9, wherein the second RAT comprises a MulteFire RAT.

11. The method of claim 1, wherein the handover message indicates a set of configuration parameters for the connection with the target base station, wherein the set of configuration parameters comprises one or more default values associated with the second RAT, one or more discovery measurement timing configuration (DMTC) parameters associated with the second RAT, or a combination thereof.

12. The method of claim 1, wherein the default configuration comprises a default channel configuration and a default radio bearer configuration of the target base station.

13. A method for establishing a wireless connection with a target base station in a communication system including a source base station operating according to a first radio access technology (RAT), the method comprising:
   receiving, at a user equipment (UE), a handover command from the source base station that includes a flag indicator from the target base station, the handover command comprising an indication of a default configuration for establishing a connection with the target base station and an indication that the connection with the target base station is via a second RAT different from the first RAT, the flag indicator corresponding to the second RAT;
   applying, at the UE, a configuration associated with the second RAT based at least in part on the indication of the default configuration and the indication that the connection with the target base station is via the second RAT; and
   initiating, by the UE, handover to the target base station via the second RAT based at least in part on the configuration associated with the second RAT.

14. The method of claim 13, wherein receiving the handover command comprises:
   receiving the handover command from the source base station via a dedicated control channel of the first RAT.

15. The method of claim 14, wherein the dedicated control channel comprises a radio resource control (RRC) channel and the first RAT comprises Long Term Evolution (LTE).

16. The method of claim 13, wherein receiving the handover command comprises:
   receiving a handover message that complies with a protocol of the first RAT, wherein the first RAT comprises a 3rd generation partnership project (3GPP) RAT.

17. The method of claim 16, wherein the second RAT comprises a MulteFire RAT that operates using an unlicensed radio frequency spectrum band.

18. The method of claim 13, further comprising:
   determining, by the UE, a set of configuration parameters for the connection with the target base station based at least in part on the handover command, wherein the configuration is applied based at least in part on the set of configuration parameters.

19. The method of claim 18, wherein the set of configuration parameters comprises one or more default values associated with the second RAT, one or more discovery measurement timing configuration (DMTC) parameters associated with the second RAT, or a combination thereof.

20. The method of claim 13, wherein receiving the handover command comprises:
   receiving an indication that a frequency of the target base station operates using a frequency band associated with the second RAT.

21. The method of claim 13, wherein the default configuration comprises a default channel configuration and a default radio bearer configuration of the target base station.

22. An apparatus for establishing a wireless connection with a user equipment (UE) in a communication system including a source base station operating according to a first radio access technology (RAT), the apparatus comprising:
   a processor;
   memory in electronic communication with the processor; and
   instructions stored in the memory and executable by the processor to cause the apparatus to:
   receive, at the source base station, a handover message from a target base station, the handover message comprising an indication of a default configuration for establishing a connection with the target base station and an indication that the connection with the target base station is via a second RAT different from the first RAT, wherein the handover message comprises a flag indicator corresponding to the second RAT;
   configure a handover command that includes the flag indicator corresponding to the second RAT; and
   transmit, by the source base station and to the UE, the handover command that includes the flag indicator corresponding to the second RAT based at least in part on the handover message.

23. The apparatus of claim 22, wherein the instructions are further executable by the processor to cause the apparatus to:
   transmit, by the source base station, a handover request message to the target base station, the handover request message indicating that the UE is a candidate for handover, wherein the handover message is received in response to the handover request message.

24. The apparatus of claim 23, wherein the instructions are further executable by the processor to cause the apparatus to:
   receive, at the source base station, a handover response message from the target base station, wherein the handover response message comprises a radio resource control (RRC) configuration message of the first RAT.

25. The apparatus of claim 22, wherein the instructions are further executable by the processor to cause the apparatus to:
   configure, by the source base station, the handover command based at least in part on the handover message, wherein the handover command complies with a protocol of the first RAT and the first RAT comprises a 3rd generation partnership project (3GPP) RAT.

26. The apparatus of claim 25, wherein the second RAT comprises a MulteFire RAT that operates using an unlicensed radio frequency spectrum band.

27. An apparatus for establishing a wireless connection with a target base station in a communication system including a source base station operating according to a first radio access technology (RAT), the apparatus comprising:
   a processor;
   memory in electronic communication with the processor; and
   instructions stored in the memory and executable by the processor to cause the apparatus to:
   receive, at a user equipment (UE), a handover command from the source base station that includes a flag indicator from the target base station, the handover command comprising an indication of a default configuration for establishing a connection with the target base station and an indication that the connection with the target base station is via a second RAT different from the first RAT, the flag indicator corresponding to the second RAT;
   apply, at the UE, a configuration associated with the second RAT based at least in part on the indication of the default configuration and the indication that the connection with the target base station is via the second RAT; and
   initiate, by the UE, handover to the target base station via the second RAT based at least in part on the configuration associated with the second RAT.

28. The apparatus of claim 27, wherein the instructions to receive the handover command are executable by the processor to cause the apparatus to:

receive the handover command from the source base station via a dedicated control channel of the first RAT.

29. The apparatus of claim 28, wherein the dedicated control channel comprises a radio resource control (RRC) channel and the first RAT comprises Long Term Evolution (LTE).

30. The apparatus of claim 27, wherein the instructions to receive the handover command are executable by the processor to:
receive a handover message that complies with a protocol of the first RAT, wherein the first RAT comprises a 3rd generation partnership project (3GPP) RAT.

* * * * *